US009237338B1

(12) United States Patent
Maguire, Jr.

(10) Patent No.: US 9,237,338 B1
(45) Date of Patent: Jan. 12, 2016

(54) APPARATUS FOR IMAGE DISPLAY WITH MULTI-FOCAL LENGTH PROGRESSIVE LENS OR MULTIPLE DISCRETE LENSES EACH HAVING DIFFERENT FIXED FOCAL LENGTHS OR A VARIABLE FOCAL LENGTH

(71) Applicant: SIMULATED PERCEPTS, LLC, Southbury, CT (US)

(72) Inventor: Francis J. Maguire, Jr., Southbury, CT (US)

(73) Assignee: SIMULATED PERCEPTS, LLC, Southbury, CT (US)

( * ) Notice: Subject to any disclaimer, the term of this patent is extended or adjusted under 35 U.S.C. 154(b) by 0 days.

(21) Appl. No.: 14/512,407

(22) Filed: Oct. 11, 2014

Related U.S. Application Data

(60) Provisional application No. 61/890,648, filed on Oct. 14, 2013.

(51) Int. Cl.
*H04N 13/04* (2006.01)
*G02B 27/10* (2006.01)
*G02B 27/22* (2006.01)
*G02B 27/01* (2006.01)

(52) U.S. Cl.
CPC .......... *H04N 13/049* (2013.01); *G02B 27/0172* (2013.01); *G02B 27/1066* (2013.01); *G02B 27/2214* (2013.01); *G02B 27/2228* (2013.01); *H04N 13/0404* (2013.01); *H04N 13/044* (2013.01); *H04N 13/0436* (2013.01); *H04N 13/0497* (2013.01); *G02B 2027/0132* (2013.01); *G02B 2027/0154* (2013.01); *G02B 2027/0156* (2013.01)

(58) Field of Classification Search
USPC ........................................................ 359/376
See application file for complete search history.

(56) References Cited

U.S. PATENT DOCUMENTS

| 5,172,235 | A |   | 12/1992 | Wilm et al. |
|---|---|---|---|---|
| 5,418,364 | A |   | 5/1995 | Hale et al. |
| 5,557,459 | A | * | 9/1996 | Samson ............. G02B 27/0172 348/E13.039 |
| 5,644,324 | A |   | 7/1997 | Maguire, Jr. |
| 6,094,182 | A |   | 7/2000 | Maguire, Jr. |
| 6,246,382 | B1 |  | 6/2001 | Maguire, Jr. |
| 6,281,862 | B1 |  | 8/2001 | Tidwell et al. |
| 6,529,331 | B2 |  | 3/2003 | Massof et al. |
| 6,734,911 | B1 |  | 5/2004 | Lyons |

(Continued)

OTHER PUBLICATIONS

Kirbis, Matej and Kramberger, Iztok, "Mobile device for electronic eye gesture recognition," IEEE Transactions on Consumer Electronics, published Nov. 2009 (current version published Jan. 11, 2010), p. 2133 (last page of pp. 2127-2133 with EOG sensor in Fig. 15), vol. 55, Issue 4, IEEE Consumer Electronics Society (1 page total).

(Continued)

*Primary Examiner* — Sath V Perungavoor
*Assistant Examiner* — Dakshesh Parikh

(57) ABSTRACT

One or more display elements of an apparatus provide light representative of distant objects and near objects and at least one optical element of the apparatus is responsive to the light representative of the near objects, for providing video images of the near objects at one or more near focal lengths, and is responsive to the light representative of distant objects, for providing video images of the distant objects at one or more far focal length and positioned for viewing at an elevation above the video images of the near objects.

12 Claims, 15 Drawing Sheets

(56) References Cited

U.S. PATENT DOCUMENTS

| | | |
|---|---|---|
| 7,088,516 B2 | 8/2006 | Yagi et al. |
| 7,646,404 B2 | 1/2010 | Liu et al. |
| 7,663,662 B2 | 2/2010 | Miller et al. |
| 8,189,089 B1 * | 5/2012 | Georgiev ............ G02B 27/1066 348/340 |
| 2004/0164926 A1 | 8/2004 | Schonlau |
| 2007/0296809 A1 * | 12/2007 | Newbery ............ H04N 13/0239 348/42 |
| 2008/0117289 A1 | 5/2008 | Schowengerdt et al. |
| 2009/0275366 A1 * | 11/2009 | Schilling ............... G06F 1/1615 455/566 |
| 2010/0118127 A1 | 5/2010 | Nam et al. |
| 2011/0032482 A1 | 2/2011 | Agurok |

OTHER PUBLICATIONS

Ng, Ren, "Digital Light Field Photography," Ph.D dissertation, Stanford, Jul. 2006, Section 3.5 (Generalizing the Plenoptic Camera), at pp. 37-39 (3 pages total).

* cited by examiner

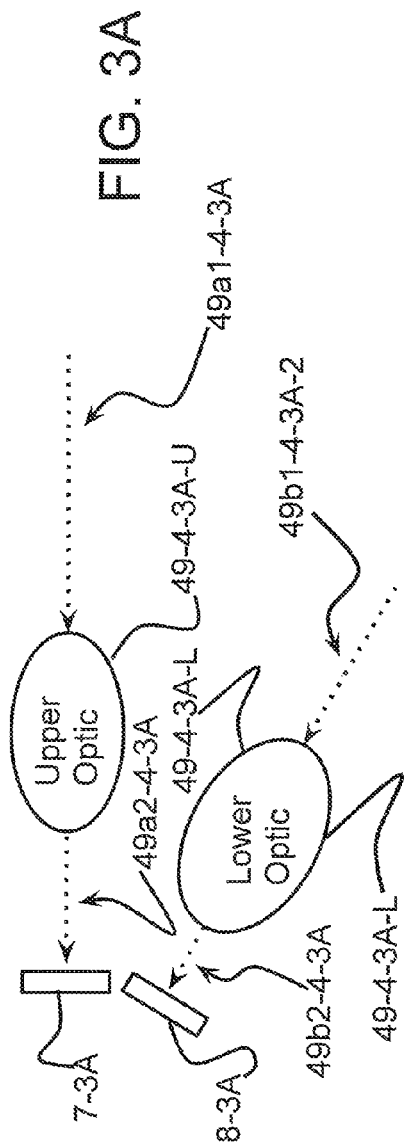
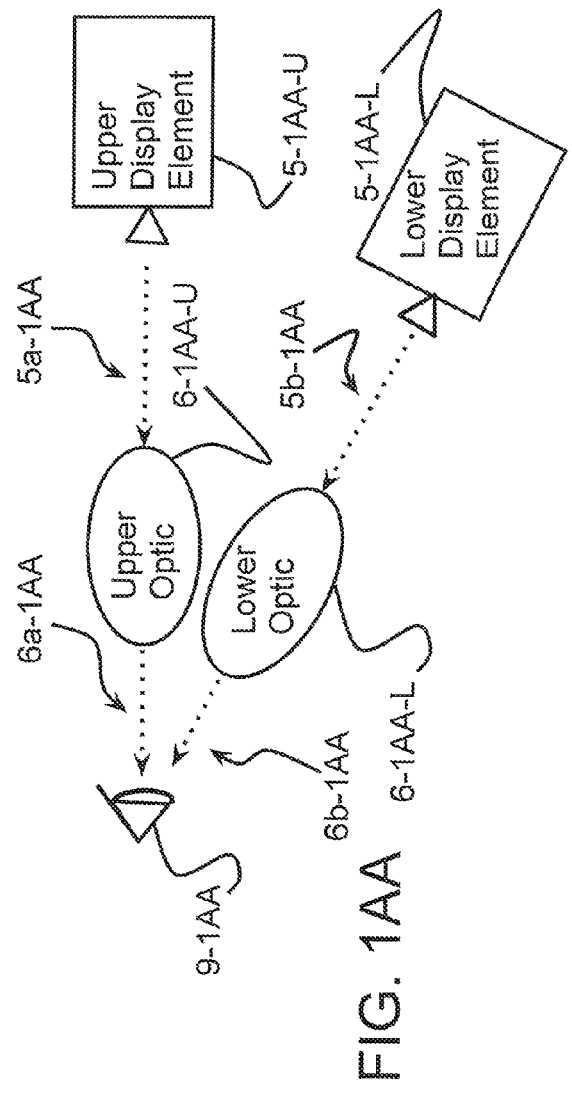

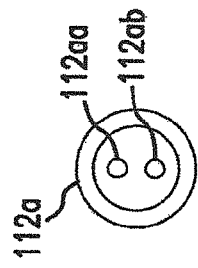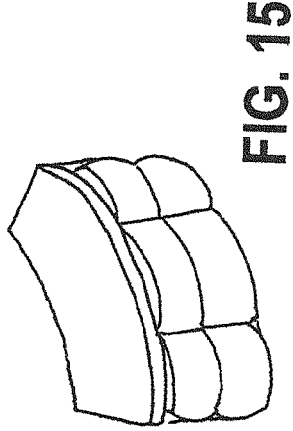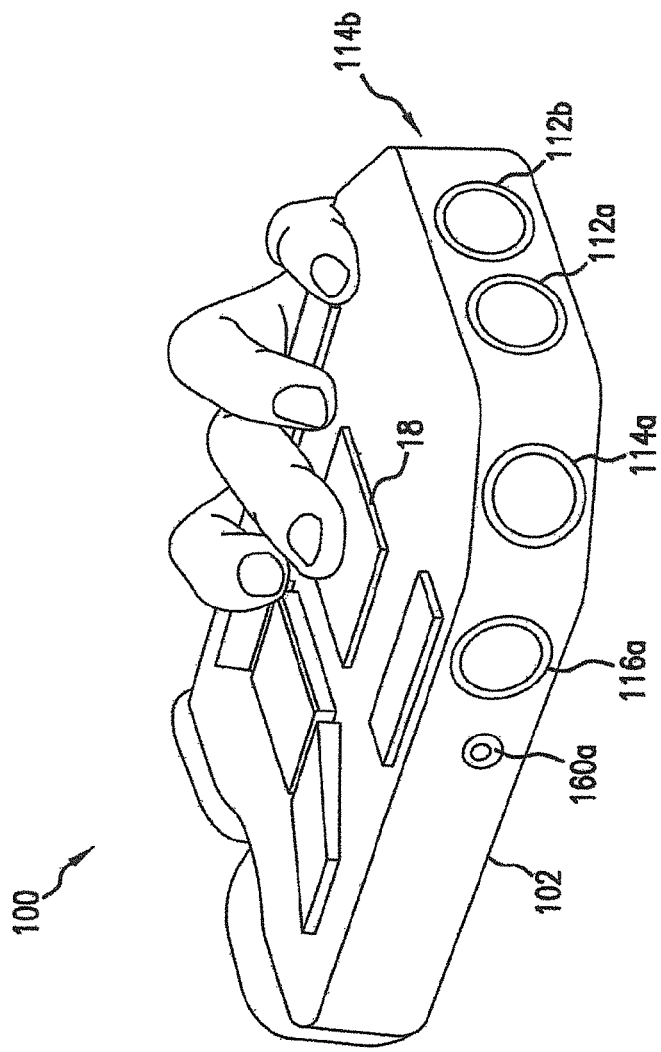

APPARATUS FOR IMAGE DISPLAY WITH MULTI-FOCAL LENGTH PROGRESSIVE LENS OR MULTIPLE DISCRETE LENSES EACH HAVING DIFFERENT FIXED FOCAL LENGTHS OR A VARIABLE FOCAL LENGTH

BACKGROUND OF THE INVENTION

Still photography and motion picture capture by traditional film/cinematography or more recently by electronic means such as electronic still or video image capture rely on fixed focal length optics/lenses. For over a hundred years, viewing by a viewer or playback to a viewer, the captured imagery is presented for viewing at a static focal length, e.g., on a flat piece of paper in the case of photographs, emitted from a flat surface in the case of liquid crystal or plasma display, projected onto the back of a diffuse surface for viewing from the front, or projected onto a reflective surface such as a movie screen. In other words, the viewer's accommodation does not change while viewing images of different objects at different depths in different regions within the presented imagery. Even if the viewer's eyes change in convergence angle, as in stereoscopic video, the accommodation remains the same. This leads to cognitive discomfort.

U.S. Pat. No. 5,644,324 shows a method and apparatus for providing, in response to successive image signals and a control signal, the successive images at various apparent distances. If the images are stereoscopic, the harmonious natural relationship between accommodation and convergence may be preserved so as to avoid cognitive strain otherwise experienced by the viewer. The images may have a highly detailed component which has its image content changed according to changes in the direction of a monitored one or more visual axes. U.S. Pat. Nos. 6,094,182 and 6,246,382 disclose but claim different aspects of the same subject matter. Although stereoscopic motion pictures, computer generated stereoscopic imagery and video, and even consumer stereoscopic cameras have begun to be introduced, techniques for addressing accommodation have proved slow to become adopted in the present commercial marketplace due to inertia and perhaps also due to the relative complexity of the possible technical solutions and the attendant expense. There have been many devices disclosed along these lines over the last decade, notably from the University of Washington in a "scanned beam display with adjustable accommodation" by Tidwell et al (U.S. Pat. No. 6,281,862), and a "variable fixation viewing distance scanned light displays" by Schowengerdt et al (U.S. Patent Application Publication 2008/0117289). Another notable disclosure of a "3D autostereoscopic display with true depth perception" was recently disclosed by Ilya Agurok (U.S. Patent Application Publication No. 2011/0032482) but, so far as is known, none of the disclosed devices have so far actually been made or used in any consumer or military display device.

The above-mentioned traditional still photography and motion picture capture by fixed focal length optics/lenses has also been accompanied by those of skill in the art using narrow field of view lenses. There have been some efforts to change this situation, notably by Fred Waller in the "Cinerama" initiative of the 1950s in which imagery of the same scene taken from three relatively narrow field of view cameras were presented alongside each other to spectacularly increase the horizontal field of view presented in special theaters with three screens abutted side-by-side for a nearly seamless presentation. Although Cinerama presented a spectacular wide field of view, it failed not because audiences rejected it or grew bored with it (in fact it was a sensation at the time), but for other reasons, including the fact that there were too many problems involved with projecting three 35 mm films simultaneously. Moreover, exhibitors were reluctant to risk an investment in the necessary new equipment required to present a non-standard format. Studios/distributors no doubt feared that the success of any new infrastructure of this sort might seriously diminish the value existing films held in vaults, in circulation or, as yet unreleased.

What is needed is a way to bypass entrenched financial interests by providing new ways to capture and view still and video imagery that provides a wide field of view and that permits natural stereoscopic capture/viewing for both amateurs and professionals without high investment in infrastructure.

BRIEF SUMMARY OF THE INVENTION

According to a first aspect of the present invention, an apparatus is provided comprising:

at least one processor and at least one memory including computer program code, the at least one memory and the computer program code configured to, with the at least one processor, cause the apparatus at least to process at least one video signal, the apparatus further comprising:

at least one display element, responsive to the at least one processed video signal, for providing light representative of distant objects and for providing light representative of near objects; and at least one optical element, responsive to the light representative of the near objects, for providing video images of the near objects at at least one near focal length, and responsive to the light representative of distant objects, for providing video images of the distant objects at at least one far focal length and positioned for viewing above the video images of the near objects.

The at least one memory and the computer program code may be configured to, with the at least one processor, cause the apparatus to retrieve the video signal from the at least one memory.

The at least one memory and the computer program code may be configured to, with the at least one processor, receive a streaming video signal from a network over a wired or wireless connection to the apparatus and cause the apparatus to process said received streaming video signal for providing said processed streaming video signal to said at least one display element for said providing light representative of distant objects and for providing light representative of near objects.

The apparatus may further comprise a receptacle for receiving a portable memory device insertable into the receptacle, wherein the at least one memory and the computer program code are configured to, with the at least one processor, cause the apparatus to retrieve the video signal from the portable memory device after insertion of the portable memory device in the receptacle.

The video images of at least the distant objects may be quasi-panoramic or wide field-of-view video images.

The video images of the near objects may be stereoscopic and/or plenoptic video images and the video images of the distant objects may be monoscopic video images in whole or in part.

The video images of the near objects may be plenoptic video images and the video images of the distant objects may be stereoscopic video images.

The video images of the near objects may be stereoscopic video images and the video images of the distant objects may also be stereoscopic video images.

The video images of the near objects may be plenoptic video images and the video images of the distant objects may also be plenoptic video images.

The video images of the distant objects may be quasi-panoramic or wide field-of-view video images and the video images of the near objects may not be quasi-panoramic or wide field-of-view video images.

The video images of the near objects may be plenoptic video images optimized for spatial resolution at the expense of angular resolution or vice versa and the video images of the distant objects may be plenoptic video images optimized for angular resolution at the expense of spatial resolution or vice versa.

The apparatus may further comprise:

at least one light capturing element, responsive to light reflected from the distant objects, for providing captured light reflected from the distant objects, and responsive to light reflected from the near objects, for providing captured light reflected from the near objects, wherein the captured light reflected from the far objects is reflected from the distant objects positioned at one or more positions above the near objects and the captured light reflected from the near objects is reflected from the near objects positioned at one or more positions below the far objects;

at least one light sensor, responsive to the captured light reflected from the distant objects and to the captured light reflected from the near objects, for providing at least one sensed signal; and at least one processor, responsive to the at least one sensed signal, for providing the at least one video signal.

The apparatus at least one memory and the computer program code may be configured to, with the at least one processor, cause the apparatus to store the video signal from the at least one processor in the at least one memory.

The apparatus may further comprise a receptacle for receiving a portable memory device insertable into the receptacle, wherein the at least one memory and the computer program code are configured to, with the at least one processor, cause the apparatus to retrieve the video signal from the portable memory device either automatically or upon user command after insertion of the portable memory device in the receptacle.

The video images of at least the distant objects may be quasi-panoramic or wide field-of-view video images.

The video images of the near objects may be stereoscopic and/or plenoptic video images and the video images of the distant objects may be monoscopic video images in whole or in part.

The video images of the distant objects may be quasi-panoramic or wide field-of-view video images and the video images of the near objects may not be quasi-panoramic or wide field-of-view video images.

The video images of the near objects may be plenoptic video images and the video images of the distant objects may be stereoscopic video images.

The video images of the near objects may be stereoscopic video images and the video images of the distant objects may also be stereoscopic video images.

The video images of the near objects may be plenoptic video images and the video images of the distant objects may also be plenoptic video images.

The video images of the near objects may be plenoptic video images optimized for spatial resolution at the expense of angular resolution or vice versa and the video images of the distant objects may be plenoptic video images optimized for angular resolution at the expense of spatial resolution or vice versa.

The video signal may be a streaming video signal and wherein the at least one memory and the computer program code are configured to, with the at least one processor, send the streaming video signal to a network over a wired or wireless connection from the apparatus.

According to a second aspect of the present invention, an apparatus comprises:

at least one processor and at least one memory including computer program code, the at least one memory and the computer program code configured to, with the at least one processor, cause the apparatus at least to store at least one video signal, the apparatus further comprising:

at least one light capturing element, responsive to light reflected from distant objects, for providing captured light reflected from the distant objects focused at a long focal length, and responsive to light reflected from near objects, for providing captured light reflected from the near objects focused at a short focal length that is shorter than the long focal length, wherein the captured light reflected from the far objects is reflected from the distant objects at positions above the near objects and the captured light reflected from the near objects is reflected from the near objects from positions below the far objects;

at least one light sensor, responsive to the captured light reflected from the distant objects and to the captured light reflected from the near objects, for providing at least one sensed signal; and at least one processor, responsive to the at least one sensed signal, for providing the at least one video signal comprising video images of the distant objects and video images of the near objects.

The at least one memory and the computer program code may be configured to, with the at least one processor, cause the apparatus to store the video signal from the at least one processor in the at least one memory.

The apparatus according to the second aspect of the present invention may further comprise a receptacle for receiving a portable memory device insertable into the receptacle, wherein the at least one memory and the computer program code are configured to, with the at least one processor, cause the apparatus to store the video signal to the portable memory device after insertion of the portable memory device in the receptacle.

The video images of at least the distant objects may be quasi-panoramic or wide field-of-view video images.

The video images of the distant objects may be quasi-panoramic or wide field-of-view video images and the video images of the near objects may not be quasi-panoramic or wide field-of-view video images.

The video images of the near objects may be stereoscopic and/or plenoptic video images and the video images of the distant objects may be monoscopic video images.

The video images of the near objects may be plenoptic video images and the video images of the distant objects may be stereoscopic video images.

The video images of the near objects may be stereoscopic video images and the video images of the distant objects may also be stereoscopic video images.

The video images of the near objects may be plenoptic video images and the video images of the distant objects may also be plenoptic video images.

The video images of the near objects may be plenoptic video images optimized for spatial resolution at the expense of angular resolution or vice versa and the video images of the distant objects may be plenoptic video images optimized for angular resolution at the expense of spatial resolution or vice versa.

According to a third aspect of the present invention, an apparatus comprises:

an image-sensing component; and a variable focal length optical component that is optically coupled with said image-sensing component, wherein said variable focal length optical component is for capturing light reflected from objects at different distances from said apparatus and located within a three dimensional object space over a field of view within said object space, wherein said variable focal length optical component has a focal length which varies across said field of view such that different portions of said optical component capture light from different regions of said field of view within said object space for focus onto different corresponding regions of said image-sensing component, and wherein said apparatus forms or is able to form images of objects at varying distances from said apparatus.

The apparatus may further comprise at least one processor configured to cause the apparatus at least to process data from said image-sensing component.

The apparatus may further comprising at least one memory including computer program code, the at least one memory and the computer program code configured to, with the at least one processor, cause the apparatus at least to stitch together images captured from said image-sensing component to create a quasi-panoramic or wide field-of-view image.

The focal length of said optical component may vary progressively across an axis of said optical component, wherein objects are in focus progressively across an axis of said image-sensing component, according to distance of the objects from said optical component.

The focal length of said optical component may vary progressively across multiple axes of said optical component.

The apparatus may be operable to focus near objects at a fraction of a meter, not less than about an eighth of a meter in at least one region of said field of view.

The present invention proceeds from the consideration that a simpler approach to solving the cognitive problem caused by current stereoscopic techniques would be to capture and display images using a multi-focal length lens such as a progressive lens, or multiple discrete lenses each having different fixed focal lengths, some combination of progressive and non-progressive lenses, or even a variable focus lens or at least one other controllable optical element. Bifocal lenses have been used for eyeglasses for a long time (since the mid-18$^{th}$ century) to give the user two discrete focal lengths, one for distance viewing of objects at elevations higher in the visual field and the other for near vision tasks such as reading that are carried out at lower elevations in the visual field. Trifocal lenses are similar to bifocals but have an additional (intermediate) segment for intermediate vision of objects at intermediate elevations above a segment corresponding to the lower reading elevation. Progressive spectacle lenses present the user with a single surface that provides far, intermediate, and near vision in a gradual, continuous progression of increasing dioptric power from far to near focus. If the same concept is applied to the problem at hand, at least on the image display side but possibly also on both the image capture side and the image display side, the normal accommodation and convergence relationship is at least approximated and the user can experience a harmonious viewing of images of objects at different distances without noticeable cognitive disharmony.

Further, the present invention also proceeds from the consideration that the inventive image capture and image display paradigms can be combined in a single device that may be a portable device designed to be lightweight in use for instance as a consumer electronic device, e.g., for consuming or sharing either still or video imagery over a network or from a prestored storage medium. Industrial applications would be forseen as well. Such a portable device may be sized for handheld use or made for use in a wearable embodiment such as incorporated in an eyeglass type frame or in an immersive head mounted display. A handheld consumer electronic device will be presented in detail below but the same principles are applicable to other devices.

Still further, the present invention also proceeds from the consideration that such a simpler approach could also be improved so as to provide wide field of view imagery. Imagery of this kind may be captured and presented in such a way as to emulate the wide field of view of the human visual system. Such may for example be done by capturing a central area with a first image characteristic such as higher resolution in a relatively narrow field of view and adjacent peripheral areas with a second image characteristic such as lesser resolution in wider fields of view. Another such first characteristic may be color imagery and a corresponding second characteristic being black and white imagery (monochrome). Moreover, the present invention may employ stereoscopic, plenotic, or both stereoscopic and plenotic techniques. There may be an overlap of left and right eye images presented in a central area with no overlap, i.e., monoscopic imagery presented in peripheral areas. According to the teachings hereof, since stereoscopic and/or plenoptic viewing is mainly advantageous for objects at near and intermediate distances, stereoscopic and/or plenoptic capture and presentation may be confined to near focal lengths only, or confined to near and intermediate focal lengths as well, but not used for far focal lengths. In other words, the invention also proceeds from the consideration that the field of view of the captured/presented imagery may employ both (1) at least one stereoscopic and/or plenoptic region and (2) at least one non-stereoscopic or non-plenoptic (e.g. monoscopic) region. The stereoscopic and/or plenoptic region or regions may correspond to regions captured/presented at shorter focal lengths e.g. at low elevations in the visual field (corresponding to downcast eyes for instance) while the non-stereoscopic or non-plenoptic region or regions correspond to regions captured/presented at longer focal lengths, e.g. at elevations higher in the visual field (corresponding to eyes straight ahead for instance).

BRIEF DESCRIPTION OF THE DRAWINGS

FIG. 1AA shows an example of the display element and the optical element of FIG. 1A.

FIG. 3A shows an example of the optical component(s) and the image sensing component(s) of FIG. 3.

FIG. 12 shows an apparatus according to the present invention equipped with one or more cameras for capturing one or more images.

FIG. 13 shows that for embodiments such as that shown in FIG. 12, there may be two cameras provided stacked on top of each other in each of the camera openings of for instance FIG. 12.

FIG. 15 shows a camera module with optics similar in principle to the display optics shown in FIG. 11 for installation on a device such as on the front of the device 10 of FIG. 11.

DETAILED DESCRIPTION OF EMBODIMENTS

Figure 1A:
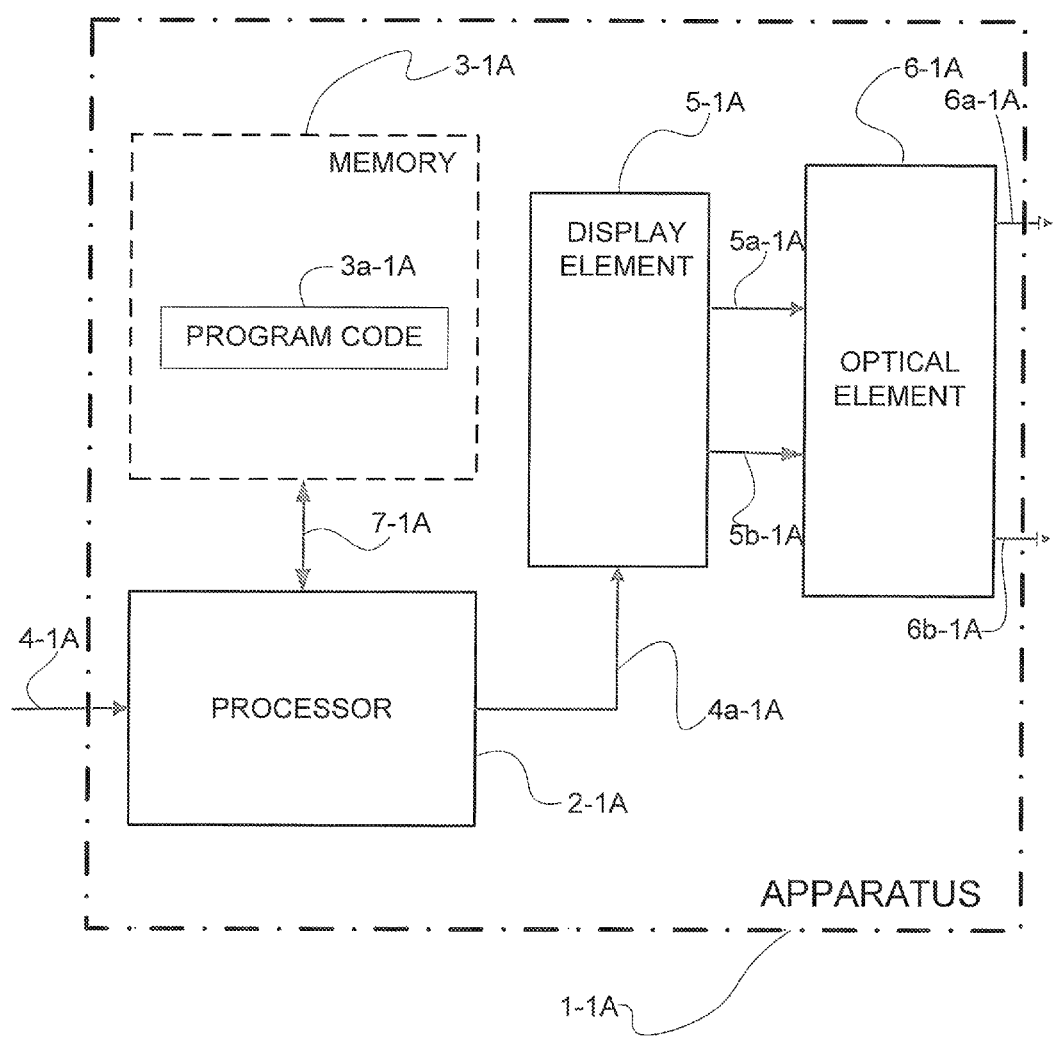
FIG. 1A shows an apparatus, according to an embodiment of the present invention.
Figure 2:
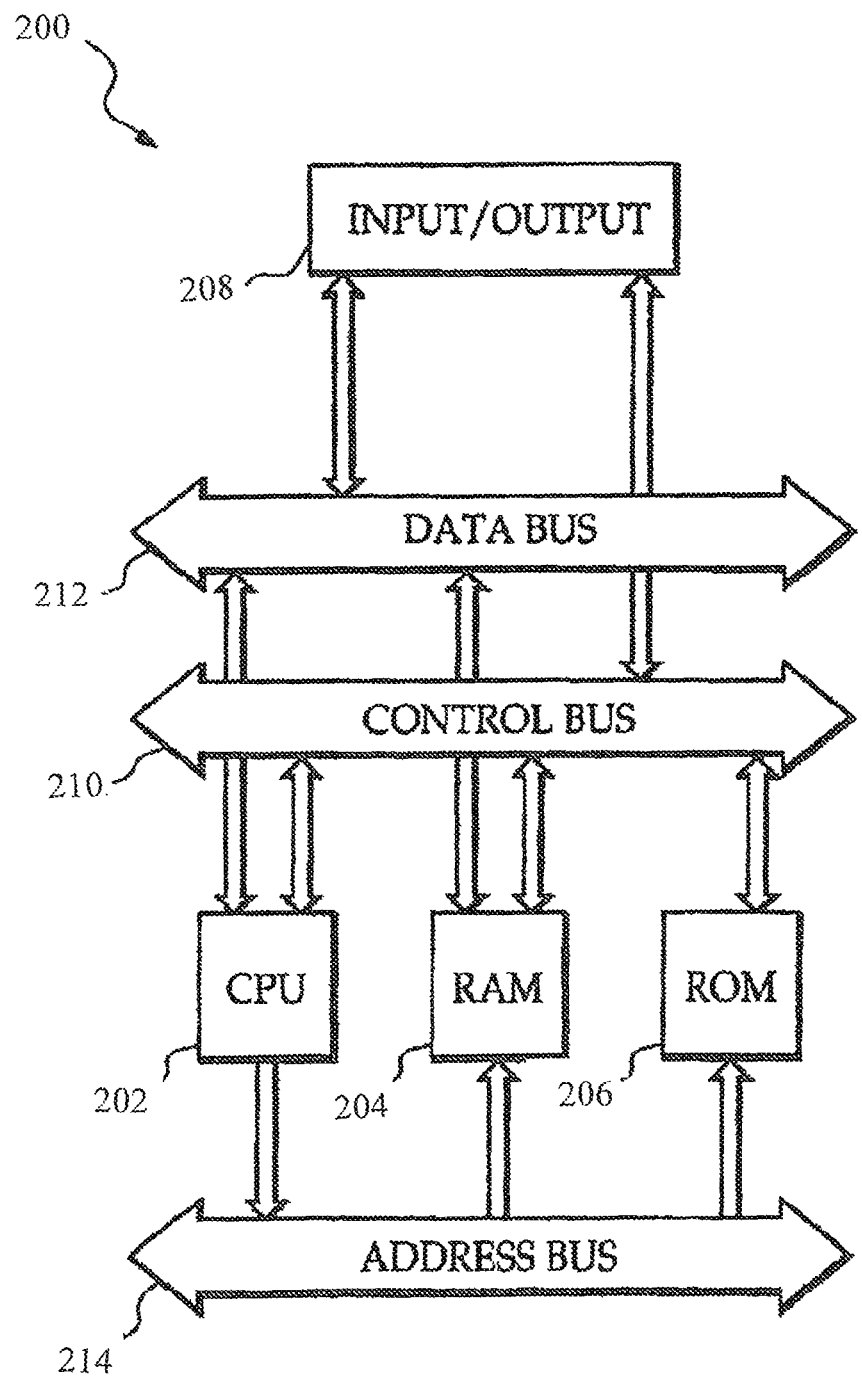
FIG. 2 shows a signal processor that may be installed in any of the apparatus embodiments of the present invention, or that may employ a nontransitory computer readable medium that is used to store computer program code executable by the signal processor in carrying out a method according to the present invention.

FIG. 1A shows an apparatus 1-1A including at least one signal processor 2-1A and at least one memory 3-1A including computer program code 3a-1A, the at least one memory and the computer program code configured to, with the at least one signal processor, cause the apparatus at least to process at least one signal such as a video signal 4-1A and provide a processed video signal 4a-1A. The computer program code may be machine code in the form of a computer program, i.e., a set of instructions executable by a computer's central processing unit (CPU). The set of instructions may have been compiled or interpreted from mnemonic codes chosen and arranged in sequence from an assembly language (a higher-level language) by a skilled computer programmer. The nature of the processing may for instance be to decode an encoded video signal transmitted over a network such as the Internet and received on the line 4-1A and to provide a decoded video signal on the line 4a-1A. The signal processor may be a general purpose signal processor such as shown in FIG. 2 including program code and described in more detail below, or may be an equivalent specialized signal processor. If specialized, some or all of the functions carried out by the program code may instead be executed by hardware internal to the specialized signal processor. If streaming video is received, a streaming server will for instance deliver a bitstream using a transport protocol such as MMS, RTP, HLS, or MPEG-DASH. The video stream will have previously been encoded using a video codec such as MPEG-4 Part 2, VC-2 (Dirac), etc. The encoded video will typically be assembled in a container (e.g., MP4, FLV, WebM, ASF or ISMA) with encoded audio. The processor 2-1A may interact with the streaming server using a control protocol such as MMS or RSTP and is equipped to disassemble and decode the incoming video signal. The apparatus 1-1A further includes at least one display element 5-1A, responsive to the at least one processed video signal on the line 4a-1A, for presentation of information for visual reception. The at least one display element may present visual information by emitting light (e.g. one or more of liquid crystal display (LCD), electroluminescence, photoluminescence, incandenscence, and cathodoluminescence) or by modulating light (e.g. one or more of electrophoresis, electrochromism, electrowetting, and electromechanical modulation) or by both emitting and modulating light. The display element 5-1A may for instance be for providing emitted and/or modulated light as shown on a line 5a-1A representative of or representable as distant objects and for providing emitted and/or modulated light as shown on a line 5b-1A representative of or representable as near objects. The apparatus 1-1A may further include at least one optical element 6-1A, responsive to the light on the line 5a-1A representative of or representable as the distant objects, for providing viewable video images as shown on a line 6a-1A of the distant objects, and responsive to the light on the line 5b-1A representative of or representable as near objects, for providing viewable video images on the line 6b-1A of the near objects and positioned for viewing below the viewable video images on the line 6a-1A of the far objects. In one embodiment, the optical element 6-1A is responsive to light on the line 5b-1A for providing the viewable video images on the line 6b-1A of the near objects at a fixed near focal length, and is responsive to the light on the line 5a-1A representative of distant objects, for providing video images on the line 6a-1A of the distant objects at a fixed far focal length and positioned for viewing above the video images on the line 6b-1A of the near objects. Although the display element 5-1A and the optical element 6-1A are shown as distinct elements, they may be combined or partly combined in some embodiments to form an electronic visual display component. In another embodiment, the light on the lines 5a-1A and 5b-1A may be presented as viewable video images directly without the aid of an optical element.

Instead of the apparatus 1-1A receiving the video signal on the line 4-1A, the at least one memory 3-1A and the computer program code 3a-1A may be configured to, with the at least one processor 2-1A, cause the apparatus to retrieve the video signal from the at least one memory 3-1A and provide a retrieved video signal on a line 7-1A between the memory 3-1A and the processor 2-1A. Such actions may for instance be carried out in response to a command signal initiated by a user of the apparatus 1-1A and provided to the processor 2-1A.

The at least one memory 3-1A and the computer program code 3a-1A may be configured to, with the at least one processor 2-1A, receive the video signal 4-1A as a streaming video signal from a network over a wired or wireless connection to the apparatus 1-1A and cause the apparatus to process the received streaming video signal, with the memory 3-1A employed as a temporary cache, before providing a processed streaming video signal on the line 4a-1A (or from the memory 3-1A) to the at least one display element 5-1A for providing light on the line 5a-1A representative of distant objects and for providing light on the line 5b-1A representative of near objects to the optical element 6-1A for providing corresponding viewable streaming video images on the lines 6a-1A, 6b-1A.

FIG. 1AA shows an example of the display element and the optical element of FIG. 1A. An upper display element 5-1AA-U provides light on a line 5a-1AA representative of or representable as distant objects to an upper optical element 6-1AA-U that, in response thereto, provides optically processed light on a line 6a-1AA for viewing, e.g., by an eye 9-1AA of a user of the apparatus 1-1A. The upper display element 5-1AA-U and the upper optical element 6-1AA-U are arranged so as to provide the light on the line 6a-1AA as imagery such as a video of viewed objects at an elevation in the visual field corresponding to the head in a pose for straight-ahead or distance viewing, i.e., objects in the field of view that are centered about a line of sight intersecting the eye 9-1AA that is roughly parallel to the ground. A lower display element 5-1AA-L provides light on a line 5b-1AA representative of or representable of near objects to a lower optical element 6-1AA-L that, in response thereto, provides optically processed light on a line 6b-1AA for viewing, e.g., by the eye 9-1AA of the user of the apparatus 1-1A. The lower display element 5-1AA-L and the lower optical element 6-1AA-L are arranged so as to provide the light on the line 6b-1AA as imagery such a video of objects at an elevation corresponding to reading or closeup viewing with a downcast eye, i.e., centered on a line of sight intersecting the eye 9-1AA that is lowered so that the line of sight is pointing toward the ground and as such is representative of objects at an elevation in the field of view that are below the objects in the field of view represented by the light on the line 6a-1AA.

Figure 1B:
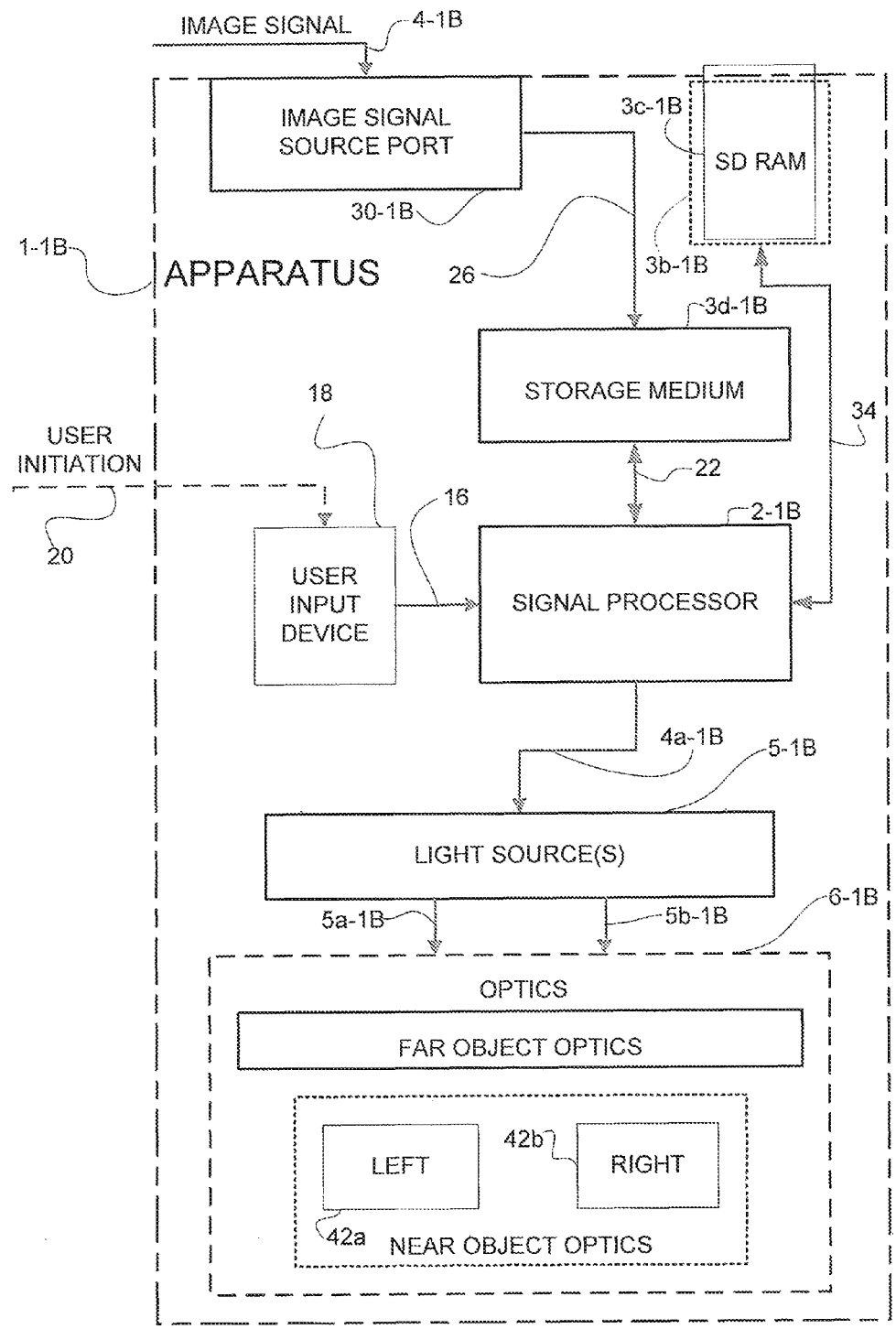
FIG. 1B shows an apparatus, according to an embodiment of the present invention.

In an embodiment shown in FIG. 1B, an apparatus 1-1B may further include a receptacle 3b-1B for receiving a portable memory device 3c-1B insertable by a user of the apparatus 1-1B into the receptacle 3b-1B, wherein at least one memory 3d-1B and computer program code stored thereon are configured to, with at least one signal processor 2-1B, cause the apparatus 1-1B to retrieve a stored video signal from the portable memory device 3c-1B after insertion of the portable memory device in the receptacle 3b-1B. The retrieved video signal will typically have been encoded using an encoding standard such as H.264/MPEG-4 AVC or H.265 and the signal processor 2-1B will be equipped to decode the retrieved signal either by a program stored e.g. on the storage medium 3d-1B, by hardware, or by a combination of a program and hardware.

In an embodiment, the video images of at least the distant objects may be wide field-of-view (e.g. having a horizontal angular extent of between forty-five and ninety degrees), panoramic (e.g., greater than two hundred and seventy degrees), or quasi-panoramic (e.g., greater than or equal to ninety degrees but less than or equal to two hundred and seventy degrees) video images.

In an embodiment, the video images of the near objects may be stereoscopic and/or plenoptic video images and the video images of the distant objects may be monoscopic video images. For instance, in the embodiment of FIG. 1B, the light source(s) 5-1B (such as a display element) may have a structure that emits or modulates light in response to a stereoscopic part of the signal on the line 4a-1B for providing emitted or modulated light on a line 5b-1B to a near object optic(s) part of optical element 6-1B that includes a left near object optical element subpart 42a and a right near object optical element subpart 42b. Likewise, the display element 5-1B may emit or modulate light in response to a monoscopic part of the signal on the line 4a-1B for providing emitted or modulated light (or both) on a line 5a-1B to a far object optic(s) part of optical element 6-1B. The monoscopic and stereoscopic/plenoptic parts of the signal on the line 4a-1B may be multiplexed onto one signal line 4a-1B such as shown or could be provided on separate signal lines. The near object optics may for example provide stereoscopic and/or plenoptic video imagery of objects at a lower elevation, i.e., below that of objects in the visual field represented by the monoscopic video imagery. The stereoscopic and/or plenoptic video imagery may be viewable with eyes downcast to view imagery representative of objects at an elevation in the visual field that is below that at which the far objects are made viewable by the optics 6-1B, e.g., straight-ahead. In an embodiment, the video images of the near objects may be plenoptic video images and the video images of the distant objects may be stereoscopic video images. In an embodiment, the video images of the near objects may be plenoptic video images and the video images of the distant objects may also be plenoptic video images. In such an embodiment, the upper plenoptic may be optimized for angular resolution while the lower plenoptic may be optimized for spatial resolution. In an embodiment, the video images of the near objects may be stereoscopic video images and the video images of the distant objects may be stereoscopic video images. In such an embodiment, the upper stereoscopic optics may be optimized for accommodative viewing of distant objects while the lower plenoptic may be optimized for accommodative viewing of near objects.

As mentioned above and as shown in FIG. 2, a general purpose signal processor may be used for the at least one signal processor 2-1A of FIG. 1A or the signal processor 2-1B of FIG. 1B. As such, it may comprise microprocessor-based circuitry 200 as shown. The microprocessor-based circuitry 200 may comprise a combination of a central processor unit 202, a random access memory 204, a read only memory 206, an input/output device 208 and an address, control and data bus generally indicated as 210, 212, 214 for interconnecting the combination. The microprocessor-based circuitry in FIG. 2 is shown by way of example, and the scope of the invention is not intended to be limited to any particular configuration of microprocessor-based circuitry. The scope of the invention is not intended to be limited any particular implementation of the apparatus 1-1A or the apparatus 1-1B or the apparatus of FIG. 1C or the combination of hardware and software to effect any such particular implementation. In view of more detailed design parameters set forth below, a person skilled in the art could implement an apparatus according to the teachings hereof using different combinations of hardware and software.

In an embodiment, the video images of the distant objects may be wide field-of-view or quasi-panoramic video images and the video images of the near objects may not be wide field-of-view or quasi-panoramic video images, e.g. having a relatively narrow field of view. In that case, the video images of the near objects may be stereoscopic or plenoptic video images or both and the video images of the distant objects may be monoscopic video images. In another embodiment, the video images of the near objects may be stereoscopic and/or plenoptic video images and the video images of the distant objects may be monoscopic video images. Alternatively, the video images of the distant objects may be stereoscopic and/or plenoptic as well.

Figure 1C:
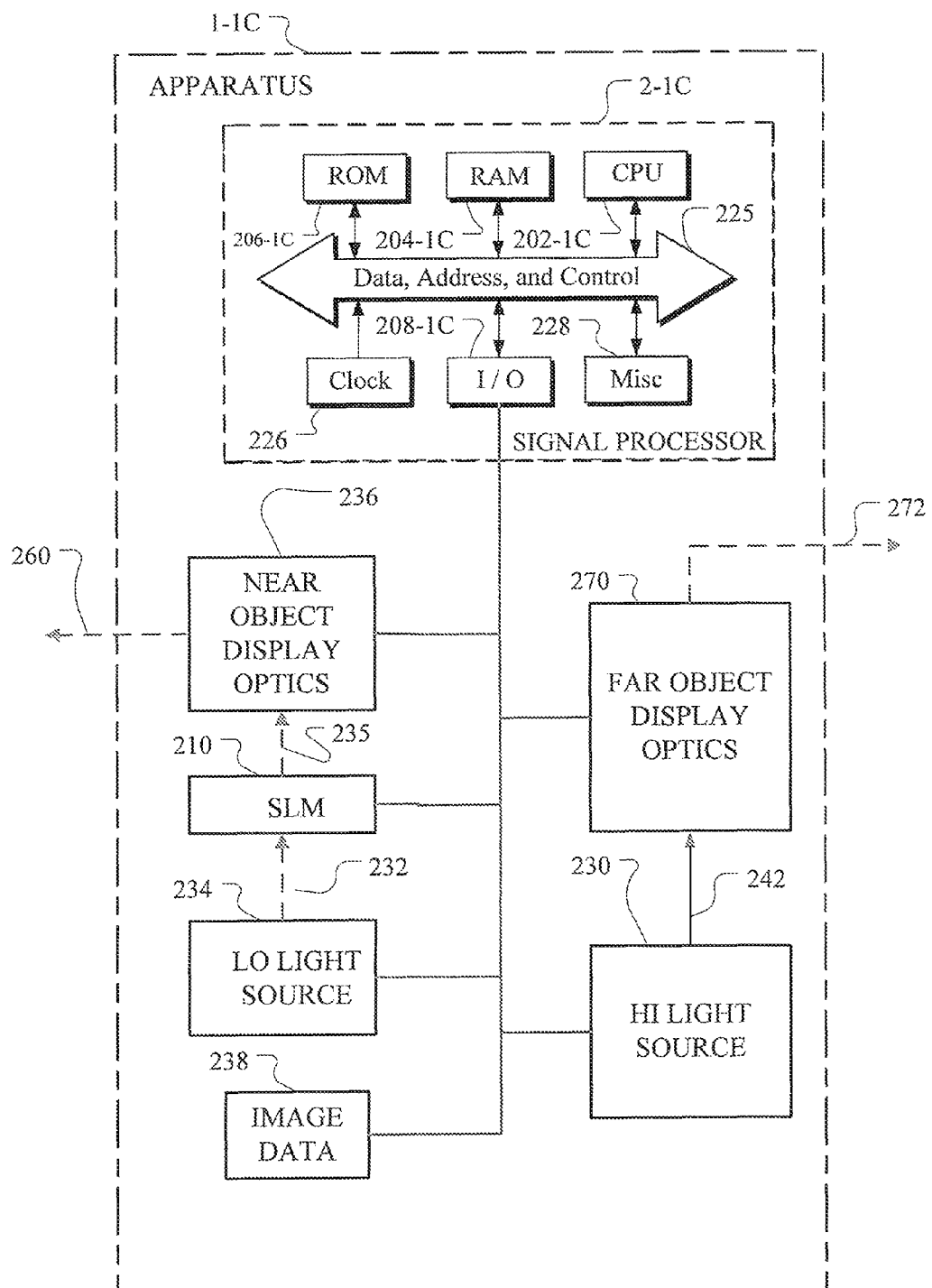
FIG. 1C shows an apparatus, according to an embodiment of the present invention.

FIG. 1C shows an apparatus 1-1C embodiment comprising a signal processor 2-1C including a CPU 202-1C, a RAM 204-1C, a ROM 206-1C, an input/output port 208-1C, a bus 225 signifying various data, address, and control lines interconnecting the various elements shown in simplified form including a clock 226 and miscellaneous components known to those of skill in the art. The apparatus 1-1C also includes a spatial light modulator 210 that is responsive to light on a line 232 from a light source 234 with image information from an image data storage device 238. The image data is provided to the light source 234 from the image data storage device 238 under the overall control of the signal processor 2-1C which is connected to both as well as to the spatial light modulator 210. In response to the light provided by the light source 234, the spatial light modulator provides modulated light on a line 235 either directly for viewing by at least one user of the apparatus or to a near object display optical element 236. If provided, the near object display optic(s) is(are) responsive to the modulated light signal on the line 235 for providing light on a line 260 for viewing by the at least one user of the apparatus 1-1C. In an embodiment, the near object display optic(s) 236 may also be connected to the signal processor, as shown, in the event that it is an active optical element capable of having its optical properties altered under the control of the signal processor 2-1C. Otherwise, it is not necessarily connected and operates as a passive optical element. As in the embodiment of FIG. 1B, the embodiment of FIG. 1C may also include a separate far object optical element 270 for providing light on a line 272 in response to light on a line 242 from a light source 230 also connected to the signal processor 2-1C. If the apparatus is not equipped with far object display optical element 270, the light on the line 242 may be provided directly. The near object display optic(s) 236 provide(s) video imagery of objects at a lower elevation in the field of view, i.e., below that of the video imagery of objects provided on the line 272 by the far object display optic(s) 270. For instance, the near object optical element 236 is arranged to provide the video imagery on the line 260 so that it is viewable with eyes downcast at imagery of objects at an elevation in the field of view that is below that at which the far objects are made viewable by the optic(s) 270, e.g., arranged so as to present the video imagery on the line 272 for straight-ahead viewing, above the elevation at which objects in the field of view of the video imagery on the line 260 is viewable.

In an embodiment, for instance the embodiment of FIG. 1B, the user input device 18 may include at least one camera including a light capturing element, responsive to light reflected from the distant objects, for providing captured light reflected from the distant objects, and responsive to light reflected from the near objects, for providing captured light reflected from the near objects, wherein the captured light reflected from the far objects is reflected from the distant objects positioned at one or more elevational positions above the near objects and the captured light reflected from the near objects is reflected from the near objects positioned at one or more positions below the far objects. The camera of the user input device 18 of the apparatus 1-1B may further include at least one light sensor, responsive to the captured light reflected from the distant objects and to the captured light reflected from the near objects, for providing at least one sensed signal. The camera may further include at least one processor, responsive to the at least one sensed signal, for providing at least one video signal on the line 16 to the processor 2-1B. The at least one memory 3d-1B and the computer program code may be configured to, with the at least one processor 2-1B, cause the apparatus 1-1B to store the video signal provided on the line 16 from the user input device 18 in the at least one memory 3d-1B or in the removable memory 3c-1B. The at least one memory 3d-1B and the computer program code may be configured to, with the at least one processor 2-1B, cause the apparatus to retrieve the video signal from the storage medium 3d-1B or the portable memory device 3c-1B either automatically or upon user command.

Figure 3:
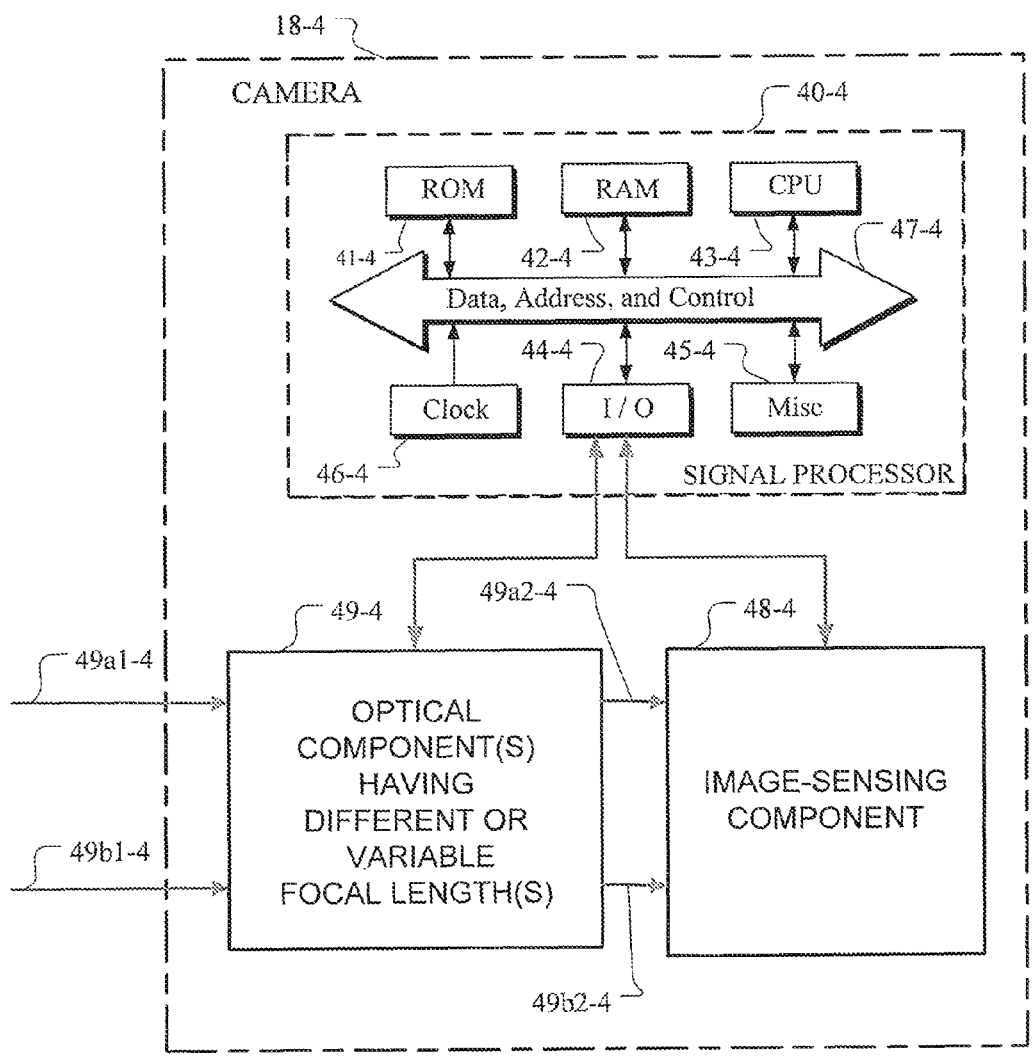
FIG. 3 shows an apparatus according to an embodiment of the present invention.

FIG. 3 shows an embodiment of the user input device 18 of FIG. 1B shown in more detail as a camera 18-4. Although the signal processor 2-1B of FIG. 1B may be used instead, the camera 18-4 may include a signal processor 40-4 that may be a special purpose signal processor or a general purpose signal processor as shown. As such, it may comprise a Read Only Memory 41-4, a Random Access Memory 42-4, a Central Processing Unit 43-4, at least one input/output port 44-4, miscellaneous other devices 45-4 omitted from the figure for the sake of simplicity, a clock 46-4, and various Data, Address, and Control lines interconnecting the various parts. The camera 18-4 may further comprise at least one image-sensing component 48-4 and one or more optical components 49-4 having different fixed focal lengths, a variable focal length or lengths, or a combination of both variable and fixed. The one or more optical components 49-4 are optically coupled with the at least one image-sensing component 48-4. The one or more optical components 49-4 are for capturing light reflected from objects at different distances from the camera 18-4 and located within a three dimensional object space over a field of view within the object space. For instance, light 49b1-4 reflected from objects located at a low elevation (in other words at a low translatory position with respect to the earth or ground) is shown being focused by the one or more optical components and provided to the at least one image-sensing component 48-4 as focused light 49a2-4 with a short focal length, for instance a focal length comparable to the lower, reading lenses of a pair of bi-focal eyeglasses. Light 49a1-4 reflected from objects at a higher elevation in the field of view is shown being focused by the one or more optical components 49-4 and provided to the at least one image-sensing component 48-4 as focused light 49a2-4 with a long focal length such as infinity or a focal length comparable to that used for distance viewing in a pair of bi-focal eyeglasses. The one or more optical components 49-4 may have a focal length that varies across a given field of view such that different portions of the one or more optical components capture light from different regions of the given field of view within the object space for focus onto different corresponding regions or parts of the at least one image-sensing component 48-4 or at different periods of time. The camera 18-4 is able to form images of objects at varying distances from the camera. The image sensing component 48-4 is shown connected by bidirectional lines to the input/output port 44-4 of the signal processor 40-4. Likewise, if controllable, the optical component 49-4 may also be connected by bidirectional lines to the input/output port 44-4 of the signal processor 40-4. The processor 40-4 may be configured to cause the camera to process data from the image-sensing component 48-4 for various purposes such as video compression carried out using a video encoding standard such as MPEG-1 Part 2, H.262/MPEG-2 Part 2, H.264/MPEG-4 AVC, H.265, etc. The memory 41-4 may include computer program code, so that the memory 41-4 and the computer program code are configured, with the processor 40-4, to cause the camera 18-4 to stitch together images captured from the image-sensing component 48-4 to create a quasi-panoramic or wide field-of-view image. The focal length of the optical component 49-4 may vary progressively across an axis of the optical component, wherein objects are in focus progressively across an axis of said image-sensing component, according to distance and/or elevation of the objects from or with respect to the optical component. The focal length of the optical component 49-4 may vary progressively across multiple axes of the optical component. The camera 18-4 may be operable to focus "near objects" at a fraction of a meter, not less than about an eighth of a meter in at least one region of the field of view.

For any of the various embodiments hereof, the video images of at least the distant objects may be quasi-panoramic or wide-field-of-view video images. The video images of the near objects may be stereoscopic or plenoptic video images or both and the video images of the distant objects may be monoscopic video images. The video images of the distant objects may be quasi-panoramic or wide field-of-view video images and the video images of the near objects may not be quasi-panoramic or wide field-of-view video images. The video images of the near objects may be stereoscopic and/or plenoptic video images and the video images of the distant objects may be monoscopic video images. Alternatively, the video images of the distant objects may be stereoscopic and/or plenoptic as well. The video signal may be a streaming video signal and the at least one memory and the computer program code may be configured to, with the at least one processor, send or receive a streaming video signal to a network over a wired or wireless connection to or from the apparatus.

Figure 4:
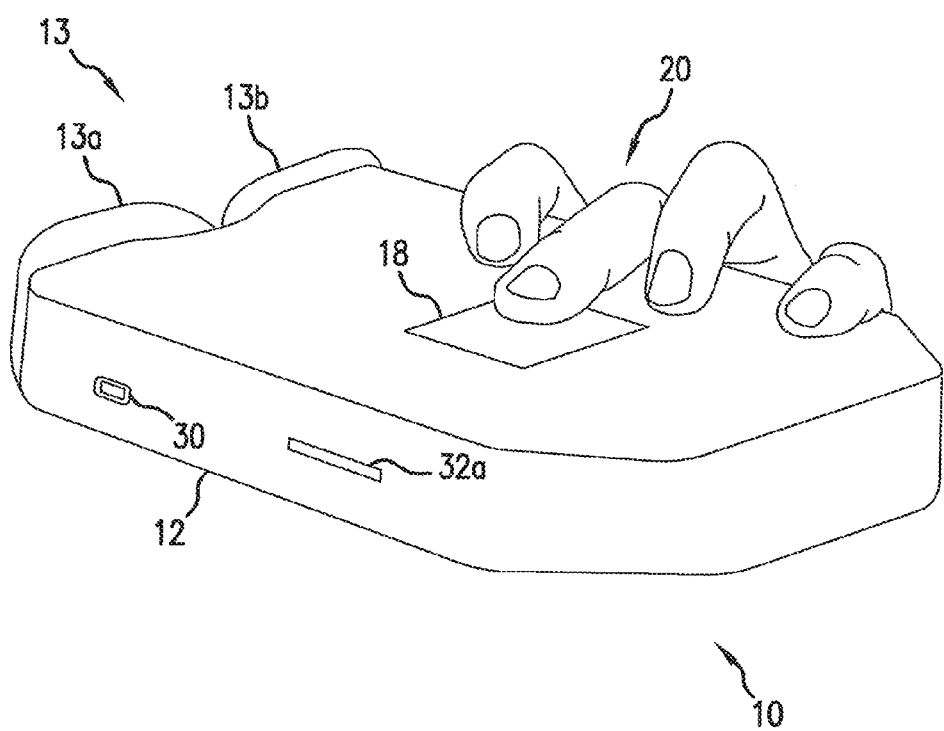
FIG. 4 shows a portable handheld panoramic image viewer device, according to the present invention.

FIG. 4 (not to scale) shows an embodiment in the form of an apparatus comprising a portable handheld quasi-panoramic or wide field-of-view image viewing device 10 that includes a portable handheld housing 12 which may for example be made of plastic. By handheld is meant that the housing is sized to be comfortably held during use between the fingers of at least one user's hand with at least one finger such as a thumb underneath the housing while in use and the other fingers on top of the housing as shown with the palm of the hand alongside a side of the housing. Such a handheld image viewing device may be made as a consumer electronic device with lightweight plastic or a hardened military grade device of a stronger material such as a lightweight metal or phenolic resin. As such, it is lightweight, easy to carry, and conveniently sized to be about the same size as a typical book, more or less, so as to allow both eyes to be aligned with a viewing end. One possible shape is a rectangular shape (roughly a parallelepiped with two rounded corners) such as shown in the FIGS. 4, 11, 12 and 14. One selected size for such a rectangular shaped device is about 9.5 inches by 7.875 inches by 1.875 inches (occupying about 140 cubic inches). This would correspond to an iPad tablet in size, except being thicker. It could be made smaller but since the spacing between the human eyes is normally about two and a half inches or so, the viewing end should beneficially be wide enough to accommodate a viewing port e.g. with individual eye ports separated on-center by about that much spacing distance. A considerably thinner device housing than that mentioned above may thus be accommodated. The separation may be made adjustable for best viewing comfort. A viewing port 13 is shown provided for user viewing of quasi-panoramic or wide field-of-view imagery which may be video or still images. The viewing port may be provided with a pair of eyecups 13a, 13b for temporary placement over the user's eyes. In use of the device 10, these eyecups may rest against parts of the user's face such as the brows and cheeks surrounding orbits of the eyes of the user while the user's hand or hands temporarily hold the device 10 for such placement during the act of viewing the quasi-panoramic or wide field-of-view still or video images. In that case, the device 10 constitutes a bi-ocular image (still or video) viewer. The images may but need not be stereoscopic or plenoptic images (still or video) in whole or in part. As shown, the width of the end of the device with the viewing port 13 is about five inches. The thickness is shown as between one and two inches and the length about eight inches.

It should be understood that the word "handheld" is used herein in connection with the embodiment of FIG. 4 to mean that the device 10 of FIG. 4 is for use by a user when holding the device 10 in place for viewing images. The word "handheld" in connection with the embodiment of FIG. 4 is thus not intended to cover head mounted displays which may of course be held by the user's hands in the act of mounting on the user's head before actual use, since such are actually used in a hands-free manner. Such head mounted display devices are not covered by the word "handheld" and are expressly excluded from the embodiment of FIG. 4.

Referring back to FIG. 1B, it may show the internal parts of the device of FIG. 4. As such, the portable handheld device housing includes the signal processor 2-1B. In such an event, the processor 2-1B may be responsive to a display initiation signal on the line 16 from a user input device 18, for initiating the display of a quasi-panoramic or wide field-of-view image by first causing the processor 14 to obtain a quasi-panoramic or wide field-of-view image signal which may be a video signal for display. The user may cause the display initiation signal to be provided to the signal processor 14 by action of a user initiation signal on the line 20 to the user input device 18. The user input device may be any kind of user input device such as a pushbutton 18, as shown in FIG. 4, with the user initiation signal 20 comprising finger actuation of the pushbutton. The signal processor 2-1B may in response thereto obtain an image signal 22 for display from any available image signal source. Such might for instance include the storage medium 3d-1B in the form of a random access memory, a read only memory, a hard drive, a flash drive or any other kind of nontransitory storage medium that can be installed permanently or temporarily in a portable device such as the portable handheld housing 12 of FIG. 4. The storage medium 3d-1B may have the image signal pre-stored or it may receive such a signal on the line 26 from an available image source that provides a quasi-panoramic or wide field-of-view display signal. Such a image signal on a line 4-1B is shown coming from an external image source (not shown) and received by the image signal source port 30-1B which may be any kind of input port including wired or wireless. It may simply include a standardized bus but may also include signal conditioning functionality in order to condition the signal on the line 4-1B for providing a conditioned signal on the line 26 to the storage medium that is suitable for at least temporary storage therein and for subsequent display. Another source of image signals may be provided by an insertable/removable portable memory device such as the SDRAM 3c-1B, a memory stick device, or the like. Such a portable storage device 3c-1B is also able to provide a quasi-panoramic or wide field-of-view image signal on the line 34 to the signal processor either directly (as shown) or via the storage medium 3d-1B where it may for instance be temporarily or permanently stored. Such removable memory devices are especially convenient and advantageous for commercialization of professionally made images. The portable handheld binocular device 12 includes at least one quasi-panoramic or wide field-of-view display mounted in the portable handheld housing 12, having an image source or plural image sources responsive to at least one quasi-panoramic or wide field-of-view display signal on a line 4a-1B from the signal processor 2-1B, for providing a quasi-panoramic or wide field-of-view image or a plurality of images formed into a quasi-panoramic or wide field-of-view image for display using quasi-panoramic or wide field-of-view optics 6-1B that may include a left eye component 42a and a right eye component 42b. Displayed images are indicative of images retrieved from the medium 3d-1B or the removable memory 3c-1B in response to the user initiation signal on the line 20. FIGS. 5-9 show various means, responsive to the quasi-panoramic or wide field-of-view image signal on the line 4a-1B, for displaying a panoramic, quasi-panoramic, or wide field-of-view image during handheld use of the apparatus 10 of FIG. 4 while viewing the panoramic, quasi-panoramic, or wide field-of-view image.

The user input device 18 may include other kinds of user input devices such as additional pushbuttons, rocker arm switches, slide switches, touch-sensitive pads or screens, etc., for controlling the viewing process. As suggested above, the panoramic, quasi-panoramic, or wide field-of-view display may take various forms as shown by the few non-limiting examples that follow. More generally, the examples that follow may equally be applied to the embodiments of FIGS. 1A, 1AA, 1B, 1C, 3, and 3A as well.

Figure 5:
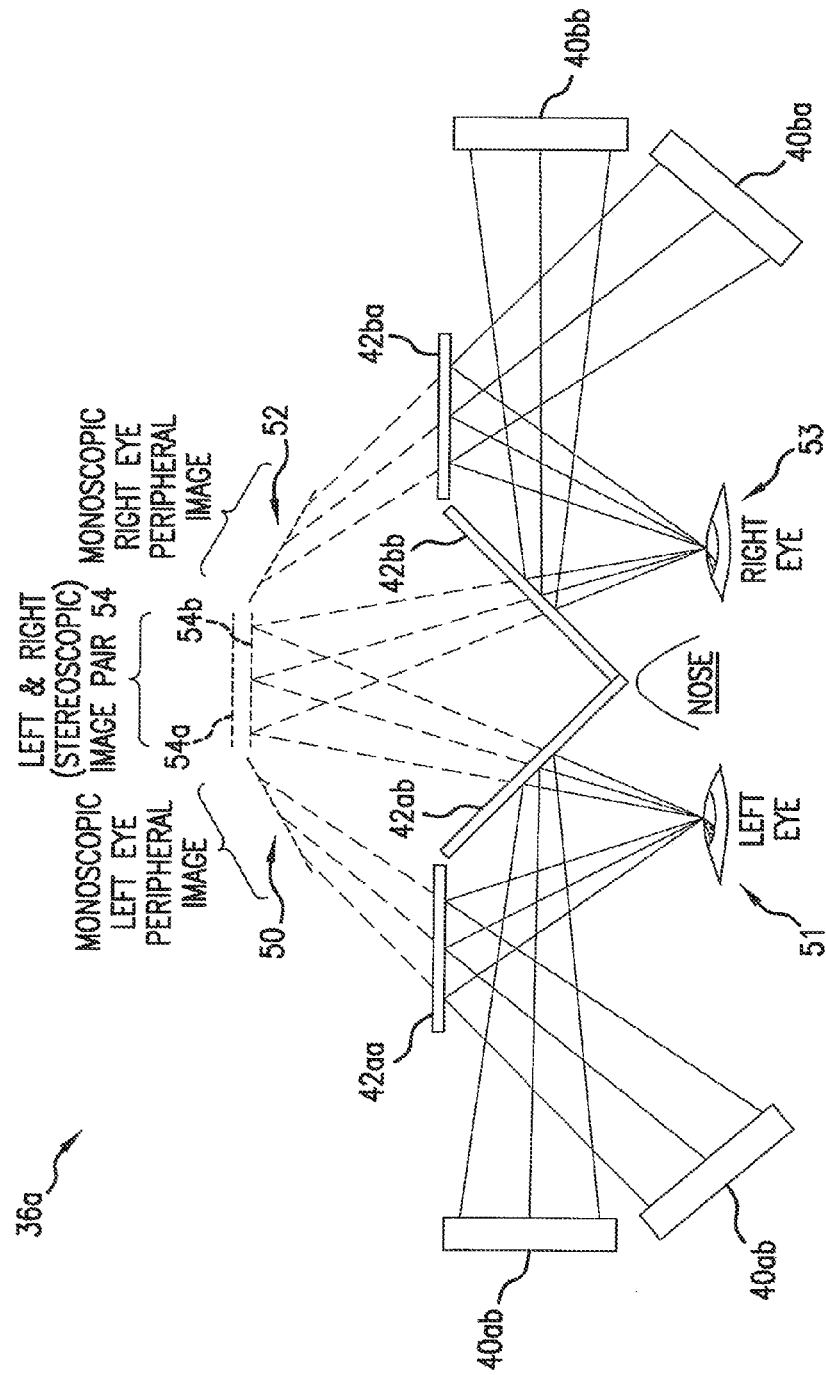
FIG. 5 shows a first embodiment of optics for the device of FIG. 4.

For example, FIG. 5 (not to scale) shows a panoramic, quasi-panoramic, or wide field-of-view display 36a part of a portable handheld quasi-panoramic or wide field-of-view device 10 from a perspective looking down over the head of a user with the portable handheld quasi-panoramic or wide field-of-view device in use. The illustrated display part may exist adjacent another display part so that one display part (as shown) is dedicated to display of far objects and another display part (not shown) is dedicated to display of near objects. A quasi-panoramic or wide field-of-view virtual image is shown for example composed of three parts, a monoscopic left eye peripheral image 50 for viewing by a left eye 51, a monoscopic right eye peripheral image 52 for viewing by a right eye 53, and a central stereoscopic or plenoptic image pair 54 for viewing by both the left eye 51 and the right eye 53. The quasi-panoramic or wide field-of-view optics 42 in this example includes a pair of left side mirrors 42aa, 42ab. A left nasal side mirror 42ab is used for reflecting an image from an image source 40ab to form a left central image 54a for the stereoscopic or plenoptic pair of images together making up the stereoscopic or plenoptic image 54. A left temple side mirror 42aa is used for reflecting an image from an image source 40aa to form the monoscopic left eye peripheral image 50. The left temple side mirror 42aa may be positioned in a planar position facing the user at a selected distance but offset to the left while the left nasal side mirror 42ab may be positioned so as to start with its right edge at the point of the nose of the user and be angled to the left so as to meet, with a left edge thereof, a right edge of the left temple side mirror 42aa. The quasi-panoramic or wide field-of-view optics 42 in this example also includes a pair of right side mirrors 42ba, 42bb. A right nasal side mirror 42bb is used for reflecting an image from an image source 40bb to form a right central image 54b for the stereoscopic or plenoptic pair of images together making up the stereoscopic or plenoptic image 54. A right temple side mirror 42ba is used for reflecting an image from an image source 40ba to form the monoscopic right eye peripheral image 52. The right temple side mirror 42ba may be positioned in a planar position facing the user at a selected distance but offset to the right while the right nasal side mirror 42bb may be positioned so as to start with its left edge at a point near the nose of the user and be angled to the right so as to meet, with a right edge thereof, a left edge of the right temple side mirror 42ba. Although shown for viewing distant objects with a central area of stereoscopic and/or plenoptic imagery, the imagery may instead be monoscopic. As suggested, the same or a similar adjacent optical arrangement may be employed for presenting images of near objects located at a lower elevation in the field of view. Such same or similar optical arrangement need not include imagery presented in peripheral regions and so may omit the displays 40ab and 40ba and the corresponding mirrors 42aa and 42ba.

Figure 6:
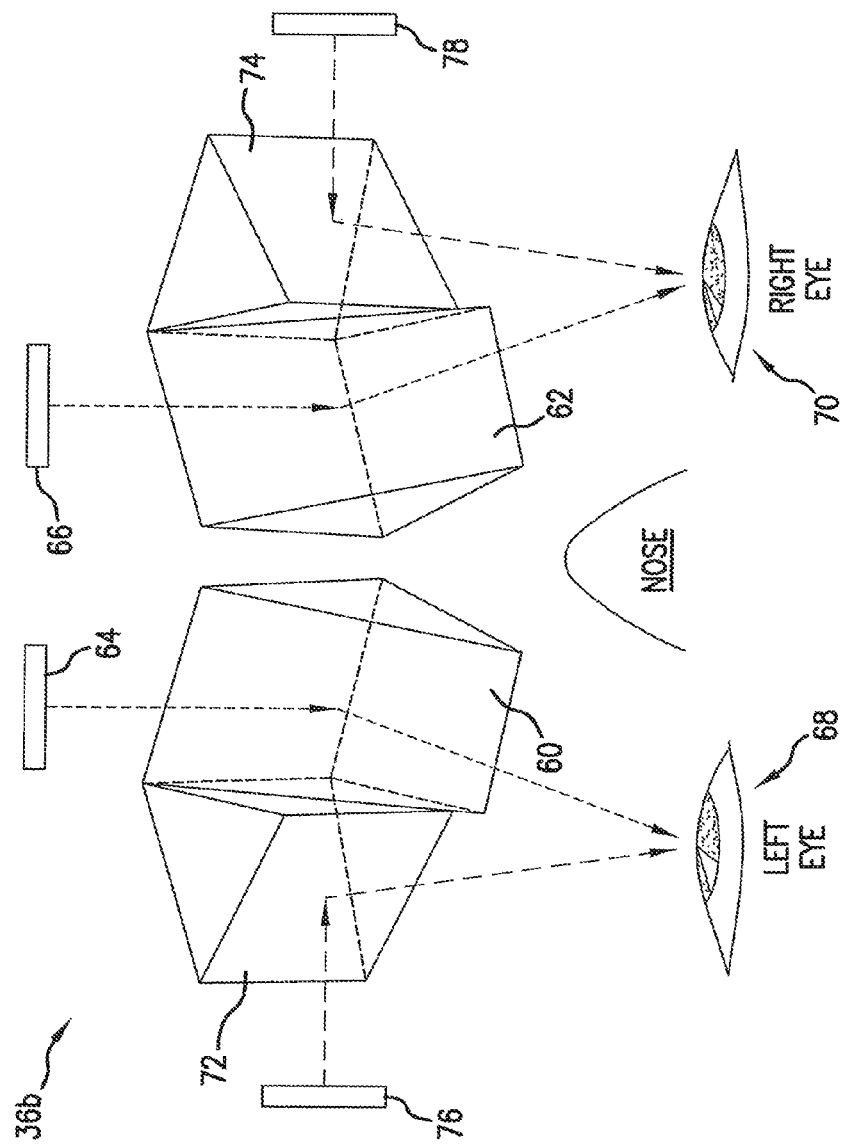
FIG. 6 shows a second embodiment of optics for the device of FIG. 4.
Figure 7:
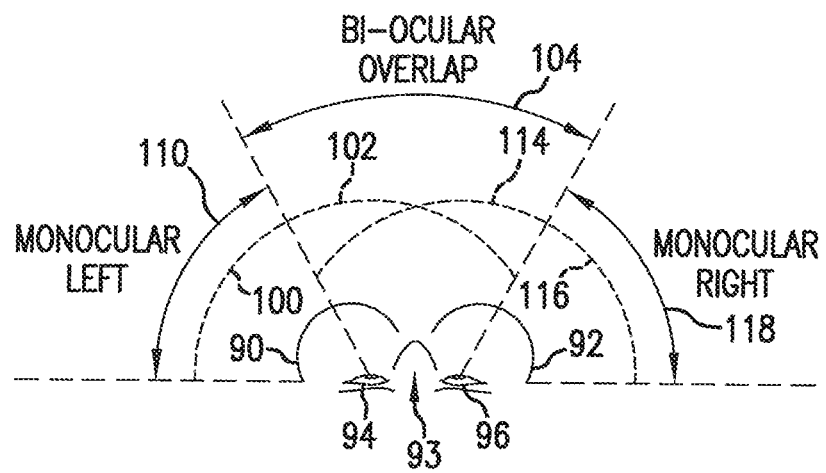
FIG. 7 shows a third embodiment of optics for the device of FIG. 4.
Figure 8:
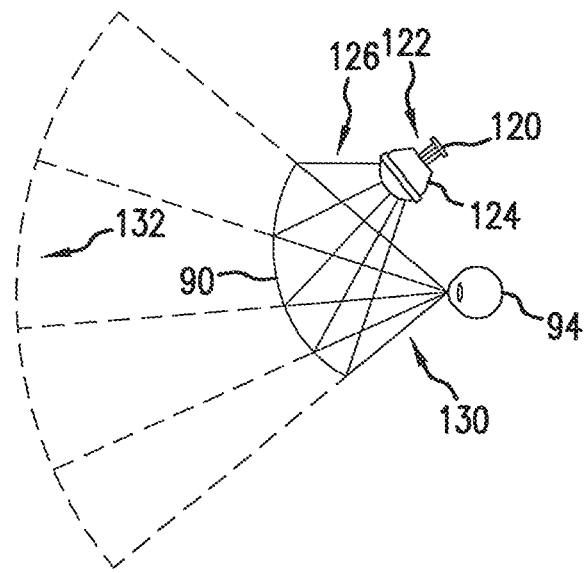
FIG. 8 shows a fourth embodiment of optics for the device of FIG. 4.

FIG. 6 (not to scale) shows another arrangement of quasi-panoramic or wide field-of-view optics 36b with quasi-panoramic or wide field-of-view image sources. Similar to FIG. 5, the arrangement shown may be for use in presenting imagery for one elevational part of the visual field of view and be duplicated or modified for use in displaying another elevational part of the visual field of view. In this case also the formation of the virtual imagery is similar to that shown in FIG. 5 but nasal side mirrors 60, 62 receive images from sources 64, 66 located above the user's eyes 68, 70 while the temple side mirrors 72, 74 receive images from sources 76, 78 located to the side of the user's eyes 68, 70. The mirrors are shown as faces of prism-shaped bodies so as to better show the spatial relationship between the mirrors but it should be realized they need not be formed as faces of prism-shaped bodies. They could be plane mirrors. Although not explicitly shown, the quasi-panoramic or wide field-of-view imaging principle is basically the same as shown in FIG. 5 with the virtual images formed "behind" the mirrors. Mirrors 60, 62 are reflective of stereoscopic or plenoptic image pairs from stereoscopic or plenoptic image pair sources 64, 66, respectively. Mirrors 72, 74 are reflective of monoscopic left and right image sources 76, 78, respectively. This embodiment could be modified by using the setup shown in FIG. 26 of U.S. Pat. No. 6,529,331. Each par of prism-shaped bodies in FIG. 6 hereof would be replaced by beamsplitters for allowing the use of reflective LCD displays. As shown by FIG. 26 in Massof et al, the use of reflective LCD displays requires a different optical geometry and an external light source, and thus the optical components are different and are arranged in a different manner than that shown in FIG. 6 hereof The mirrors of FIG. 6 hereof need not be planar mirrors. For instance, FIG. 7 (not to scale) shows a pair of left and right curved mirrors 90, 92 positioned on opposite sides of a nose 93 for viewing by respective eyes 94, 96 of a user. The left curved mirror 90 provides a left curved virtual image having a leftmost part 100 and a rightmost part 102. The curved shape of the image 100, 102 is the same as the curvature of the mirror 90. The rightmost part 102 of the image 100, 102 occupies a field of view that is in front of the viewer, i.e., straight-ahead of the nose and that may be viewed by both eyes 94, 96 in a region 104. For instance, such a central field of view might occupy forty vertical degrees and sixty horizontal degrees. The leftmost part 100 occupies a peripheral field of view region 110, off to the left of the user's head, and only viewable by the left eye 94. Such a peripheral region might occupy a forty degree vertical and sixty degree horizontal field of view. The right curved mirror 92 provides a right curved virtual image having a leftmost part 114 and a rightmost part 116. The leftmost part 114 occupies the central field of view that is in front of the viewer, i.e., straight-ahead of the nose and that may be viewed by both eyes 94, 96 in the region 104. As mentioned, the central field of view might occupy forty vertical degrees and sixty horizontal degrees. The rightmost part 116 occupies a peripheral field of view region 118, off to the right of the user's head, and only viewable by the right eye 94. As with the left peripheral region, the right peripheral region 118 might occupy a forty degree vertical and sixty degree horizontal field of view. It will be realized that the region 104 constitutes a region of overlap of the parts 102, 114 of the left and right images that are straight-ahead of the nose 93 in the central region. As such they may conveniently form overlapping stereoscopic or plenoptic pairs of images with a left stereopair image part 102 and a right stereopair image part 114. The peripheral regions 110, 118 in that case are used to display monoscopic parts 100, 116 of the left and right images. This top view representation of the field of view is similar to that shown in FIG. 12 in U.S. Pat. No. 5,644,324 where the central region covers approximately 110 degrees while each peripheral region covers up to around 35 or 40 degrees. Similar to the embodiments of FIGS. 5 and 6, the arrangement shown in FIG. 7 may be utilized for presenting one elevational region of the field of view, e.g, either the upper or lower elevational region. The same or a similar (modified) arrangement may utilized for presenting the other elevational region. For instance two adjacent sets of mirrors as shown in FIG. 7 may be placed, one above the other, to display the two different elevational regions in the field of view. One set of mirrors could be illuminated from above as shown in FIG. 8 and the other from below. There could even be an arrangement using the optical principles of one embodiment for the lower elevational imagery and the optical principles of another embodiment for the upper elevational imagery.

FIG. 8 (not to scale) shows in a side view how the left curved mirror 90 of the pair of curved mirrors 90, 92 of FIG. 7 may be set up to reflect an image from a source 120 into the left eye 94 of the user. A similar, adjacent set up would be used for the right eye with mirror 92. Rays 122 of image light (still or video) from the image source 120 may be sent to an optical component 124 such as a lens or mirror. The illustrated case shows the rays 122 sent to a fish eye projection lens. In such a case, the imagery represented by the rays 122 may have been captured by a camera fitted with a fish eye lens. Projected rays 126 propagate toward the left curved mirror 90 where they are reflected onto an inner surface thereof. Light rays 130 are reflected off the inner surface of the left curved mirror 90 and enter the left eye 94 of the viewer. These reflected rays appear to the eye 94 as a virtual image 132. Variously shaped curved surfaces and source optical configurations are of course possible, such as but not limited to those shown by Yagi et at in U.S. Pat. No. 7,088,516. Still another arrangement is shown by Schonlau in U.S. Patent Application Publication No. 2004/0164926 with ellipsoidal mirrors and a mechanical scanning device.

Figure 9:
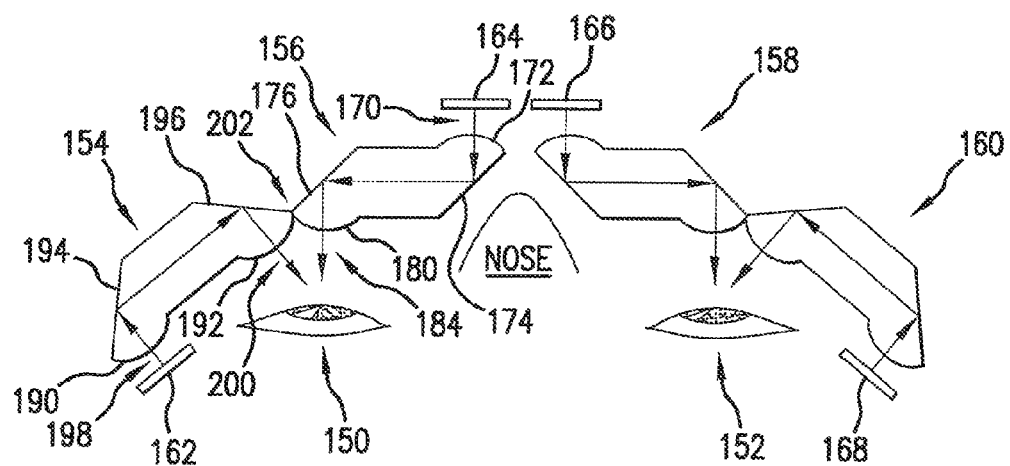
FIG. 9 shows a fifth embodiment of optics for the device of FIG. 4.
Figure 10:
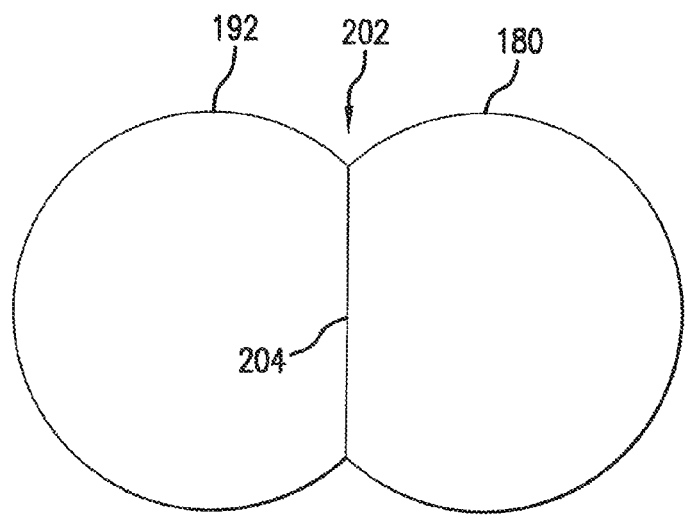
FIG. 10 shows a possible configuration for each of a pair of eyepieces used in any of the embodiments of the present invention.

FIG. 9 (not to scale) shows another quasi-panoramic or wide field-of-view display setup for a left eye 150 and a right eye 152 of a person using the device 10 of FIG. 4. This embodiment employs a plurality of optical components 154, 156, 158, 160 to present images to the eyes from a corresponding plurality of image sources 162, 164, 166, 168. A central pair of image sources 164, 166 is positioned with a left central image source 164 to the left of the nose of the person and with a right central image source 166 to the right of the nose. These may provide respective left and right stereoscopic or plenoptic images. The images may be still or video images. Left central entry light rays 170 from the left image source propagate toward and enter through a surface of an entry lens 172 of left central optical component 156. The entry lens 172 gathers the light rays 170 and they then propagate through the optical component 156 toward a reflective (mirror) surface 174 where they are reflected and propagated further toward another reflective surface 176 where they are directed toward an exit lens 180 from which they exit the component 156 as left central exit rays 184 that then enter into the left eye 150. Optical component 154 is similar to optical component 156 except that it is shown with both entry lens 190 and exit lens 192 on a same side of the component 154. They could be set up the same as component 156 however with the entry lens on the other side. In that case, the left peripheral image source 162 would be on the other side too, rather than on the same side as shown and an entry mirror 194 would be rotated ninety degrees from that shown so as to be parallel with an exit mirror 196. In any event, left peripheral entry light rays 198 from the left peripheral image source 162 propagate toward entry lens 190 where they are gathered and enter the left peripheral optical component 154 and propagate toward the reflective surface 194. There they are reflected and propagate inside the component 154 toward the exit reflective surface 196. There they are reflected toward the exit lens 192 from which they exit the optical component 154 as left peripheral exit rays 200. Together with the left central exit rays 184, the left peripheral exit rays 200 form the left half of a quasi-panoramic or wide field-of-view image for viewing by the left eye 150 of the person using the device 10. A joint 202 between the optical component 154 and the optical component 156 may be formed as shown in FIG. 10 with generally circular exit lens 192 truncated on its right edge into a straight line edge 204 so as to butt up with a similarly truncated left edge of exit lens 180. This brings together the exit pupils formed by the two adjacent lenses 192, 180 in a way that enhances their appearance as a joined together peripheral image and central image without significantly reducing the most important parts of the image light from each portion. A similar set up is shown on the right side of FIG. 9. This same approach may be used in one or more of the other embodiments of the present invention. For example, each of the eyepieces 13a and 13b of FIG. 4 one or more of the embodiments in the other figures may use this configuration, if suitable. Similar to the embodiments of FIGS. 5, 6, 7 & 8, the arrangement shown in FIG. 9 may be utilized for presenting one elevational region of the field of view, e.g, either the upper or lower elevational region. The same or a similar (modified) arrangement may utilized for presenting the other elevational region. There could even be an arrangement using the optical principles of the embodiment of FIG. 9 for one region of the elevational imagery and the optical principles of another embodiment for the other region of the elevational imagery.

Figure 11:
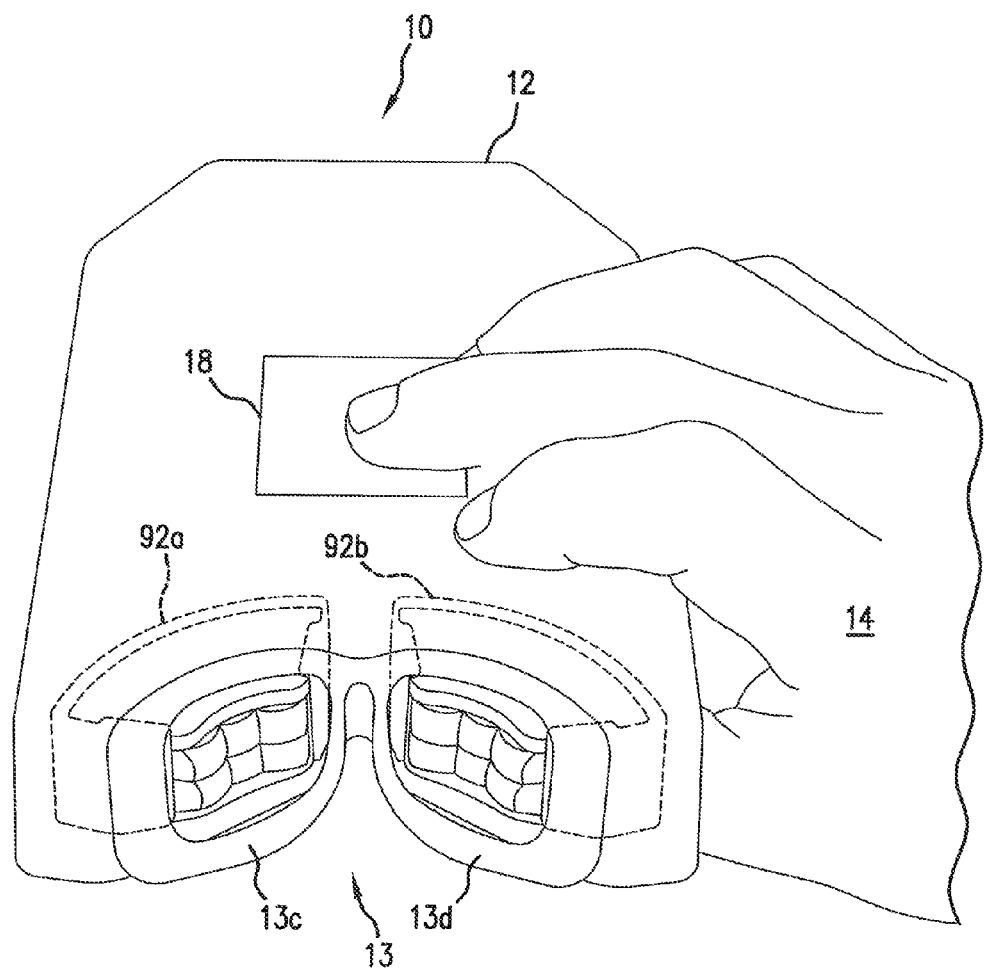
FIG. 11 shows an embodiment of a pair of eyepieces for an apparatus according to the present invention such as the device of FIG. 4.

Another embodiment shown in FIG. 11 employs an optical configuration for the quasi-panoramic or wide field-of-view display component of the present invention similar to that shown in FIG. 13 of the above-mentioned Massof et at disclosure (U.S. Pat. No. 6,529,331), except in a handheld apparatus instead of a head mounted display and using long focal length lenses for the top row of (e.g. three) lenses of each lens set and short focal length lenses for the bottom row of (e.g. three) lenses of each lens set. Thus, FIG. 4 shows a portable handheld quasi-panoramic or wide field-of-view image viewing device 10 that includes a portable handheld housing 12 which may for example be made of plastic. A viewing port 13 is provided for user viewing of quasi-panoramic or wide field-of-view images which may be video or still images. The viewing port may be provided with a pair of eyecups 13c, 13d for temporary placement over the user's eyes. In use of the device 10, these eyecups may rest against parts of the user's face such as the brows and cheeks surrounding orbits of the eyes of the user while the user's hand 14 or hands temporarily hold the device 10 for such placement during the act of viewing the quasi-panoramic or wide field-of-view still or video images. In that case, the device 10 constitutes a bi-ocular image (still or video) viewer. The images may but need not be stereoscopic or plenoptic images (still or video).

It should again be emphasized that the word "handheld" is used herein in connection with the embodiment of FIG. 4 to mean that the device 10 is for use by a user when holding the device 10 in place for viewing images. It is not intended to cover head mounted displays which may of course be held by the user's hands in the act of mounting on the user's head but which are actually used in a hands-free manner. Such head mounted display devices are not covered and are expressly excluded from the scope of the handheld embodiment of the present invention as being impractical for use as the present novelty device for handheld, short term viewing use.

As shown in FIG. 11, mounted within the housing 12 may be quasi-panoramic or wide field-of-view optics taking the form of a left display module 92a and a right display module 92b mounted behind the eyecups 13c, 13d. These may be HDSight™ display modules provided by Sensics, Inc., 810 Landmark Drive, Suite 128, Baltimore, Md. 21061, USA but modified to have longer focal length optics for the top display row and shorter focal length optics for the bottom display row. Each module presents a tiled array of displays which for instance includes a tiled array of six OLED displays. For a given module 92a, these six displays provide a 90 degree field of view. When two such modules 92a, 92b are arranged as shown in a bi-ocular way so as to overlap in the central area of view, the two modules are able to cover a 120 degree (horizontal) by 45 degree (vertical) field of view for instance with a 54 degree overlap. The overlapped central area may be used for stereoscopic or plenoptic images while the non-overlapped areas of e.g. thirty-three degrees on the left and right sides may be used for monoscopic peripheral images. According to the teachings hereof, the top three OLED displays of each module 92a, 92b are focused for far viewing of images of distant objects with a focal length chosen for distance viewing, for instance at infinity. The bottom three OLED displays of each module 92a, 92b are focused for near viewing of images of near objects with a focal length chosen for close viewing, for instance at a few feet.

FIG. 12 shows a quasi-panoramic or wide field-of-view display 100 such as the display 10 of FIG. 4 having one or more video cameras installed therein for capturing quasi-panoramic or wide field-of-view images or video, according to the present invention. For instance, in the front, there are shown a pair of camera openings 112a, 112b which together may provide stereoscopic or plenoptic images or videos for storage within the device 100 and which may also be displayed within the device 100 at the time of capture or later when replayed. The display 40ab of FIG. 5 could be used for instance to display left eye images or video images captured by a left (from the perspective of the user) camera situated in the opening 112b while the display 40bb of FIG. 5 could be used to display right eye still or video images captured by a right camera situated in the opening 112a. A slanted right camera opening 114a is shown facing at an angle for instance of 45 horizontal degrees right from the forward direction while a corresponding left camera opening facing at an angle of 45 horizontal degrees left from the forward direction is not shown but is pointed to by a reference numeral 114b. The display 40ab of FIG. 5 could be used for instance to display peripheral left eye still or video images captured by a camera situated in the left slanted opening 114b while the display 40ba of FIG. 5 could be used to display peripheral right eye still or video images captured by a right camera situated in the opening 114a. These front and slanted cameras could be used for the embodiments of FIGS. 5-12 as well. For embodiments similar to that shown in FIG. 11, an additional camera opening 116a may be provided on the right side at an angle of up to 90 degrees horizontally right from the forward direction. For the embodiment of FIG. 11 where the full field of view is only about 100-120 degrees, the camera openings 114a and 116a may slanted in such a way as to complement each other and the central opening 112a in properly providing the peripheral imagery and the overlapping central imagery. Also, since the embodiment of FIG. 11 provides a good deal of vertical field of view as well, using two rows of displays, there may be two cameras provided stacked on top of each other in one or more of the openings 112a, 112b, 114a, 114b, 116a, 116b as shown for example by the vertically stacked cameras 112aa, 112ab shown in FIG. 13. The top camera 112aa points straight ahead and may have a long focal length for capturing images of distant objects at higher elevations in a top part of a combined field of view and the lower camera 112ab points downwardly (toward an elevation below that of the top camera) and may have a shorter focal length for capturing images of near objects at lower elevations in a bottom part of the combined field of view. One or both of the cameras 112aa, 112ab may be dual-camera modules. Each dual-camera module may have two side-by-side cameras. A reason to provide a dual-camera module is to provide for digital focus, similar to that provided by light field cameras but without the need to provide actual light field technology. One such dual-camera module is designated with Part Number TCM9518MD by Toshiba. That module is 8.0×12.0×4.65 mm and allows for a relatively thin thickness profile of only 4.65 mm. Two such side-by-side dual-camera modules might for instance be arranged in a space similar in location to the space 112a of FIG. 12 with one module on top of the other module with the bottom 8 mm edge of the top module aligned with a top 8 mm edge of the bottom module. In that case the opening 112a might not be circular but rather rectangular with dimensions of 16 mm high by 12 mm wide. The top dual-camera module may be positioned as shown in FIG. 3A for capturing light 49a1-4-3A coming from a straight-ahead elevation while the bottom dual-camera module may be positioned as shown in FIG. 3A tilted downward for capturing light 49b1-4-3A-2 coming from an elevation lower than the straight-ahead elevation. The same might be done for the other openings 112b, 114a, 114b, for instance. In such cases, for instance, at least one of the openings 112a, 112b, 114a, 114b would have two such dual-camera modules so as be equipped with four cameras altogether. If the above mentioned TCM9518MD modules are used, each module collects two separate five (5) Mpixel pictures and uses an accompanying LSI chip to calculate depth data to create an upscaled thirteen (13) Mpixel image. Due to the depth information made available by the use of the dual-camera, users will be able to control captured image data during the capture or after the pictures are taken, e.g. for software refocus, image manipulation (extraction, removal, replacement of objects), gesture control, or the like.

Figure 14:
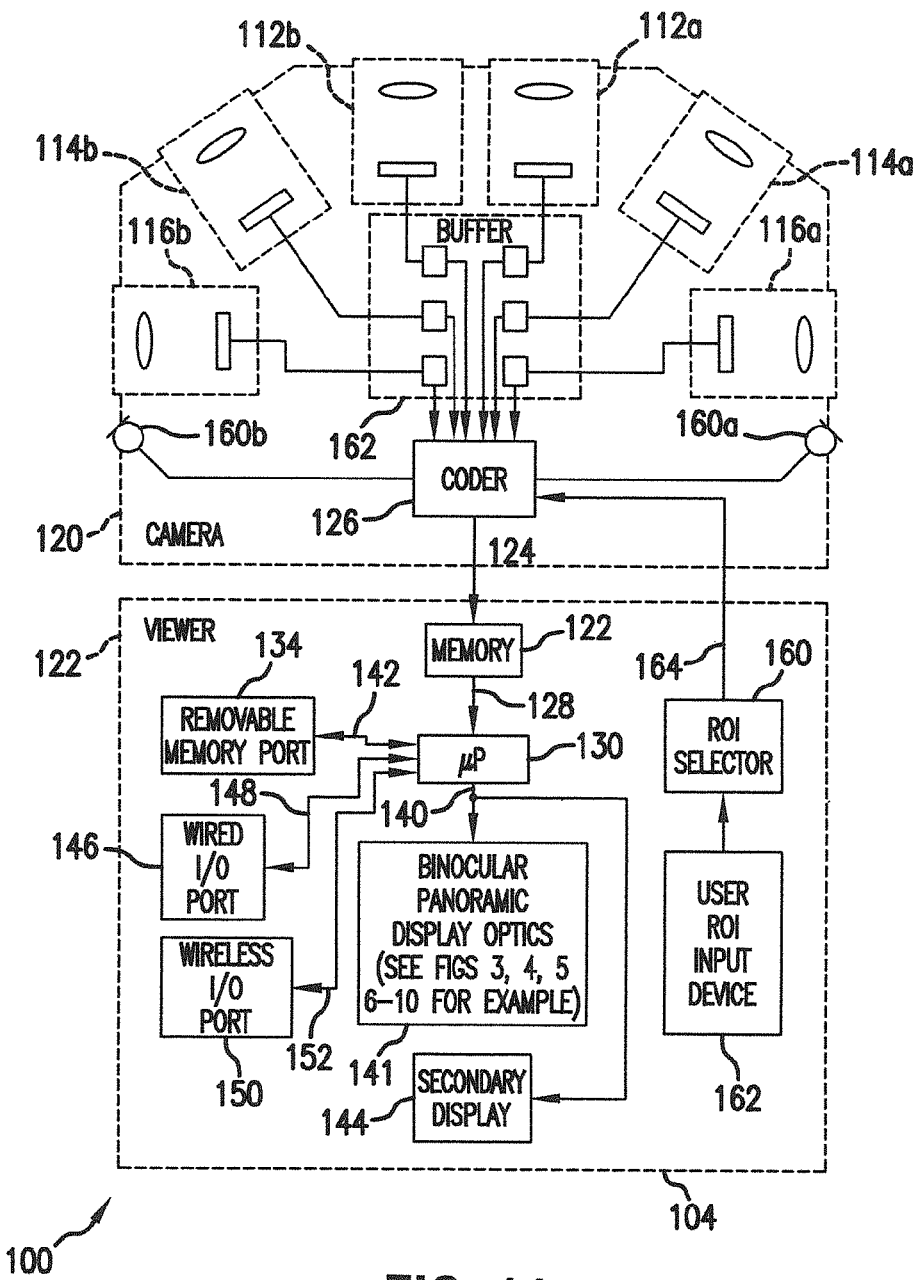
FIG. 14 shows in simplified form internal components of an embodiment equipped with one or more cameras such as those shown in FIG. 12.

FIG. 14 shows some of the internals of a portable handheld device such as the device 100 of FIG. 12 including a combined camera module 120 and viewer module 122 within a housing of the device 100. In this embodiment, a memory 122 in the viewer module may be provided for storing coded quasi-panoramic or wide field-of-view binocular and/or stereoscopic/plenoptic images received on a signal line 124 from a coder 126 in the camera module 120. The coder may carry out video compression using an appropriate video compression standard such as mentioned above and store a coded image signal in the memory 122. The coded image signal stored in the memory 122 may be retrieved in the viewer module (for instance in response to a user input command signal on the line 16 and/or 20) and provided on a signal line 128 to a processor 130 that may include a decoder function for decoding the signal on the line 128 for providing a decoded signal on a line 140 for display on display optics 141 which may take any form including any of the quasi-panoramic or wide field-of-view embodiments shown previously. Or, the processor could be used to copy the coded signal 124 previously stored on the memory 122 onto a separate removable memory 134 via signal line 128 and a signal line 142. It should be realized that the coder could provide the coded signal on the line 124 directly to the removable memory 134 as well. In addition to the binocular quasi-panoramic or wide field-of-view display optics 141, a secondary display 144 may be provided for example on the top or bottom surface of the housing (having a form for instance like the housing 12 or the housing 102). The secondary display may be touch sensitive. A wired input/output port 146 may be provided for interchanging still or video images over a wired network via a signal line 148. Similarly a wireless input/output port 150 may be provided for interchanging still or video images over a wireless network via a signal line 152. In some embodiments, a region of interest selector 160 may be provided for either automatically selecting a region of interest (ROI) in the still or video images or having the user determine the region of interest by means of a user ROI input device 162. The JPEG 2000 standard provides a way for a coder such as the coder 126 to encode regions of interest with higher resolution than other regions according to a selection signal on a line 164 from such a selector 160 or input device 162. The Motion JPEG 2000 standard provides similar functionality, among others. A suitable input device 162 would be an eye tracker or a pair of eye trackers positioned for instance in the eyecups 13*a*, 13*b* or 13*c*, 13*d*. The eye tracking may utilize infrared oculography in which an infrared lamp is installed in the device 100 and used to illuminate the eye or eyes and a camera also installed in the device 100 detects reflections from the eye as it moves in its socket. Another technique would be to use electrooculography by embedding permanent electrodes in the eyecups 13*c*, 13*d* of FIG. 11 (see Kirbis et al, "Mobile Device for Electronic Eye Gesture Recognition," IEEE Transactions on Consumer Electronics, November 2009, Vol. 55, No. 4, pp. 2127-2133). The coder 126 in the camera module 126 may be connected to a pair of microphones 160*a*, 160*b* as well as to the plurality of right camera modules 112*a*, 114*a*, 116*a*, and left camera modules 112*b*, 114*b*, 116*b* via corresponding image buffers in a buffer module 162 or directly. As described above, each camera module may include one or more lenses and one or more corresponding image sensors. The images captured by the image sensors may be temporarily stored in the corresponding buffer in the buffer module or provided directly to the coder 126. If the embodiment of FIG. 11 is employed, as suggested above, it is possible for instance to provide two cameras in each camera module such as shown in FIG. 13 with corresponding lenses of long and short focal lengths and corresponding camera sensors doubled up or even quadrupled or more in each module. The buffers might also be increased in number, for instance doubled in number.

Figure 16:
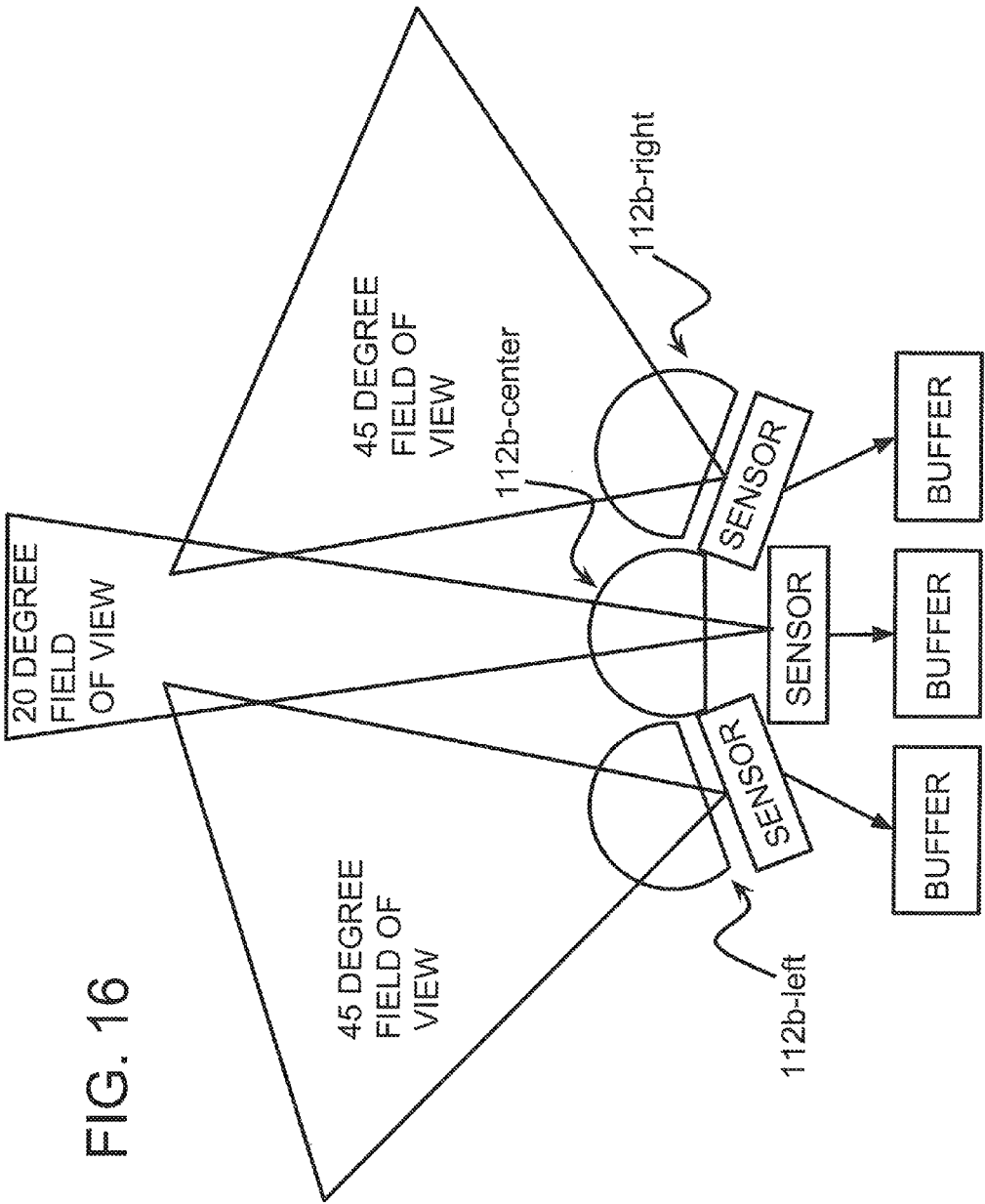
FIG. 16 shows a row of left, center and right cameras such as shown in at least one of the top row or bottom row of cameras of FIG. 15 (each including a lens, a sensor, and a buffer as shown in FIG. 16) that together capture a quasi-panoramic or wide field of view by combining a narrow field of view of the central camera with a wider field of view of both the left camera and the right camera.

FIG. 15 shows a camera module with optics similar in principle to the display optics shown in FIG. 11 for installation on a device such as on the front of the device 10 of FIG. 11. Two such camera modules may for instance be situated in camera openings on the front of the device 10 of FIG. 11, similar to the camera openings 112*a*, 112*b* of FIG. 12 but generally modified in shape to suit, e.g., modified from a circular cross-section to a rectangular cross-section to suit the modules of FIG. 15. An approximately two and a half inch separation of the openings may be provided for. This may be carried out by not using the side cameras such as the side cameras 114*a*, 116*a* of FIG. 12 and removing the beveling shown in the front corners so as to present rectangular corners and thus providing more space for two camera modules of the type shown in FIG. 15. Camera modules of the type shown in FIG. 15 may be quasi-panoramic or wide field-of-view optics taking the form of a left camera module placed in an opening similar to the left positioning of opening 112*b* and a right camera module placed in an opening similar to the right positioning of opening 112*a* but that is suitably spaced apart from the left camera module so as to match normal human eye separation of about two and a half inches. As an embodiment of the principle shown in FIG. 3A, each such camera module may have longer focal length optics for the top (upper) camera lenses and shorter focal length optics for the bottom (lower) row of camera lenses. Each module captures a tiled array of images which for instance includes a tiled array of six images, three upper tiled images and three lower tiled images. For a given camera module, these six images provide, e.g., a 90-120 degree horizontal field of view when joined together in a tiled array of images for display by for instance a corresponding left or right one of the display modules of FIG. 11. For instance, as shown in FIG. 16, a top row of cameras 112*b*-left, 112*b*-center, 112*b*-right (each including a lens, a sensor, and a buffer as shown) capture an approximate 110 degree field of view by combining the central camera 112*b*-center (having e.g. a 20 degree field of view) with the left camera 112*b*-left (having e.g. a 45 degree field of view) and the right camera 112*b*-right (having e.g. a 45 degree field of view). Further, as an embodiment of the principle shown in the lower optic 49-4-3A-L of FIG. 3A, the bottom row of cameras of FIG. 15 could be provided with shorter focal lengths with narrower fields of view but generally taking the same form as shown in FIG. 16. For instance, the central camera could be provided with a 10 degree field of view and the left and right cameras with 22.5 degree fields of view so as to halve the overall field of view of the top row of cameras. On the other hand, the bottom row of cameras could have the same overall field of view with the same overlapping fields of view as illustrated in FIG. 16 or with variations so as to take into account the expectation of close inspection with increased detail with lowered or downcast eyes of the viewer when viewing the captured imagery. When two such camera modules such as shown in FIG. 15 are arranged in suitably spaced camera openings similar to the openings 112*a*, 112*b* shown in FIG. 12 in a bi-ocular way, so as to overlap in the central area of view, the two camera modules are able to cover a wider field of view, e.g., a 120 degree (horizontal) by 45 degree (vertical) field of view for instance with a 54 degree overlap. The overlapped central area may be captured stereoscopic or plenoptic images while the non-overlapped areas of e.g. thirty-three degrees on the left and right sides may be captured monoscopic peripheral images. According to the teachings hereof, the top three cameras of each module of FIG. 15 may be focused for far capturing of images of distant objects with a focal length chosen for distance viewing, for instance at infinity. The bottom three cameras of each module may focused for capturing images of near objects with a focal length chosen for close capturing of objects, for instance at distance of a few feet or more but less than infinity. Further according to the teachings hereof, the top three cameras of each module of FIG. 15 in one embodiment may be simple two dimensional cameras. The top rows of two such left and right modules are combined for far capturing of stereoscopic images of distant objects with a focal length chosen for distance viewing, for instance at infinity. The bottom three cameras of each side-by-side module may be focused for near capturing stereoscopic or plenoptic images of near objects with a focal length chosen for close capturing of object, for instance at distance of a few feet. In another embodiment, the top row of cameras in each module may be plenoptic cameras optimized for distance viewing while the bottom row of cameras may be plenoptic cameras optimized for close viewing. In that event, the tradeoff between spatial and angular resolution could be selected to favor angular resolution in the top row of cameras and spatial resolution in the bottom row of cameras. For instance, if plenoptic cameras that utilize microlens arrays are used, the exterior, outward facing lenses pictured in FIG. 15 would each correspond to the main or objective lens of a given plenoptic camera that gathers light from the surroundings and projects it over an interior space of the camera to a microlens array with a light sensitive surface in close proximity behind it. In that event, a given light sensitive surface corresponds to one of the light sensitive surfaces 7-3A, 8-3A of FIG. 3A while the corresponding exterior, outward facing objective lens together with a microlens array corresponds to one of the upper and lower optics 49-4-3A-U, 49-4-3A-L. Even though the distance between the microlens arrays and the objective lenses may in that event remain the same for the top and bottom rows of cameras, the narrow distance between the microlens array and the light sensitive surface can be different in the top row of cameras from the distance therebetween in the bottom row of cameras. For instance, if the microlenses in both rows of cameras are focused on the apertures of the main objective lenses, the light sensitive surfaces of the top row would be fixed at the focal plane of the corresponding microlens (maximizing angular resolution while minimizing spatial resolution), while the light sensitive surfaces of the bottom row of cameras could be positioned at a lesser distance (lessening angular resolution while increasing spatial resolution). See the discussion of changes in the light field sampling pattern due to reducing the separation between the microlenses and the photosensor in section 3.5 on pages 37-9 of the dissertation "Digital Light Field Photography," by Ren Ng, July 2006. Another example would be to have the microlens array of the top row of cameras have a focus at a distance corresponding to the distance of the apertures of the top row of objective lenses (again, with the light sensitive surface fixed at the focal plane of the microlenses) while each microlens array of the bottom row of cameras would be focused at a distance that is at a shorter distance such as the image plane of the main or objective lens. In such various embodiments the display optics are made in a similar (reciprocal) way so as to match the image capturing methodology. For instance, the bottom row of three displays in the modules 92a, 92b each include display optics (corresponding to lower optic 6-1AA-L of FIG. 1AA) that focus at a shorter distance than the optics (corresponding to the upper optic 6-1AA-U of FIG. 1AA) the top row of displays.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures. Thus although a nail and screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. Apparatus, comprising:
    at least one processor and at least one memory including a computer program, the at least one memory and the computer program configured to, with the at least one processor, cause the apparatus to process at least one video signal comprising images of distant objects and images of near objects wherein the images of the near objects are plenoptic images optimized for spatial resolution at the expense of angular resolution and the images of the distant objects are plenoptic images optimized for angular resolution at the expense of spatial resolution, the apparatus further comprising:
    at least one display element, responsive to the at least one processed video signal, for providing light representative of the distant objects and for providing light representative of the near objects; and
    at least one optical element, responsive to the light representative of the near objects from the at least one display element, for providing video images of the near objects at one or more near focal lengths, and responsive to the light representative of distant objects from the at least one display element, for providing video images of the distant objects at one or more far focal lengths and positioned for viewing above the video images of the near objects.

2. The apparatus of claim 1, wherein the at least one memory and the computer program are configured to, with the at least one processor, cause the apparatus to retrieve the video signal from the at least one memory.

3. The apparatus of claim 2, wherein the at least one memory and the computer program are configured to, with the at least one processor, receive a streaming video signal from a network over a wired or wireless connection to the apparatus and cause the apparatus to process said received streaming video signal for providing said processed streaming video signal to said at least one display element for said providing light representative of distant objects and for providing light representative of near objects.

4. The apparatus of claim 1, further comprising a receptacle for receiving a portable memory device insertable into the receptacle, wherein the at least one memory and the computer program code are configured to, with the at least one processor, cause the apparatus to retrieve the video signal from the portable memory device after insertion of the portable memory device in the receptacle.

5. The apparatus of claim 1, wherein the images of at least the distant objects are quasi panoramic or wide field-of-view images.

6. The apparatus of claim 1, wherein the images of the distant objects are quasi-panoramic or wide field-of-view images and the images of the near objects are not quasi-panoramic or wide field-of-view images.

7. The apparatus of claim 1, further comprising:
    at least one light capturing element, responsive to light reflected from the distant objects, for providing captured light reflected from the distant objects, and responsive to light reflected from the near objects, for providing captured light reflected from the near objects, wherein the captured light reflected from the far objects is reflected from the distant objects positioned at one or more positions above the near objects and the captured light reflected from the near objects is reflected from the near objects positioned at one or more positions below the far objects;
    at least one light sensor, responsive to the captured light reflected from the distant objects and to the captured light reflected from the near objects, for providing at least one sensed signal; and
    at least one processor, responsive to the at least one sensed signal, for providing the at least one video signal comprising the images of the distant objects and the near objects.

8. The apparatus of claim 7, wherein the at least one memory and the computer program are configured to, with the at least one processor, cause the apparatus to store the video signal from the at least one processor in the at least one memory.

9. The apparatus of claim 7, further comprising a receptacle for receiving a portable memory device insertable into the receptacle, wherein the at least one memory and the computer program are configured to, with the at least one processor, cause the apparatus to retrieve the video signal from the portable memory device either automatically or upon user command after insertion of the portable memory device in the receptacle.

10. The apparatus of claim 7, wherein the images of at least the distant objects are quasi-panoramic or wide field-of-view images.

11. The apparatus of claim 7, wherein the images of the distant objects are quasi-panoramic or wide field-of-view images and the images of the near objects are not quasi-panoramic or wide field-of-view images.

12. The apparatus of claim 7, wherein the video signal is a streaming video signal and wherein the at least one memory and the computer program are configured to, with the at least one processor, send the streaming video signal to a network over a wired or wireless connection from the apparatus.

* * * * *